United States Patent
Colvin et al.

(10) Patent No.: US 10,626,712 B2
(45) Date of Patent: Apr. 21, 2020

(54) SYSTEMS AND METHODS FOR POSITIONING HORIZONTAL WELLS WITHIN BOUNDARIES

(71) Applicant: Landmark Graphics Corporation, Houston, TX (US)

(72) Inventors: Dan Colvin, Drippings Springs, TX (US); Gary Daniel Schottle, Sugar Land, TX (US); Colin MacDonald, Calgary (CA); Philip William Woodard, Katy, TX (US)

(73) Assignee: Landmark Graphics Corporation, Houston, TX (US)

( * ) Notice: Subject to any disclaimer, the term of this patent is extended or adjusted under 35 U.S.C. 154(b) by 168 days.

(21) Appl. No.: 15/477,585

(22) Filed: Apr. 3, 2017

(65) Prior Publication Data

US 2017/0204715 A1    Jul. 20, 2017

Related U.S. Application Data

(63) Continuation of application No. 15/015,752, filed on Feb. 4, 2016, now Pat. No. 9,611,729, which is a
(Continued)

(51) Int. Cl.
*E21B 43/30* (2006.01)
*G01V 11/00* (2006.01)
(Continued)

(52) U.S. Cl.
CPC ........ *E21B 43/305* (2013.01); *E21B 41/0092* (2013.01); *E21B 43/2406* (2013.01);
(Continued)

(58) Field of Classification Search
CPC .......... E21B 43/30; E21B 36/04; E21B 43/24; E21B 43/2406; E21B 43/305;
(Continued)

(56) References Cited

U.S. PATENT DOCUMENTS

| 6,749,029 B2 | 6/2004 | Alft et al. |
| 7,096,172 B2 * | 8/2006 | Colvin .................... E21B 43/30 |
| | | 703/10 |

(Continued)

FOREIGN PATENT DOCUMENTS

| WO | 0123829 A2 | 4/2001 |
| WO | 2006065915 A2 | 6/2006 |

OTHER PUBLICATIONS

*U.S. Appl. No. 13/635,315, Notice of Allowance dated Jul. 21, 2015, 9 pages.
(Continued)

*Primary Examiner* — Stephanie E Bloss
(74) *Attorney, Agent, or Firm* — Kilpatrick Townsend & Stockton LLP

(57) ABSTRACT

Systems and methods for positioning horizontal wells within a limited-pre-defined boundary. The systems and methods include an automated process for creating jointed target pairs or horizontal laterals to be utilized for planning horizontal wells in order to position the horizontal laterals within limited pre-defined boundary(ies).

20 Claims, 22 Drawing Sheets

Related U.S. Application Data continuation of application No. 13/635,315, filed as application No. PCT/US2010/000774 on Mar. 15, 2010, now Pat. No. 9,286,437.

(51) Int. Cl.
*E21B 43/24* (2006.01)
*E21B 41/00* (2006.01)
*G06F 19/00* (2018.01)

(52) U.S. Cl.
CPC ............ *E21B 43/30* (2013.01); *G01V 11/002* (2013.01); *G06F 19/00* (2013.01)

(58) Field of Classification Search
CPC ... E21B 41/0092; H01F 27/38; G01V 11/002; G06F 19/00
USPC ........................ 702/11, 13, 14, 182–185, 188
See application file for complete search history.

(56) References Cited

U.S. PATENT DOCUMENTS

| | | | | |
|---|---|---|---|---|
| 7,200,540 | B2* | 4/2007 | Colvin | ...................... E21B 7/00 703/10 |
| 8,484,004 | B2* | 7/2013 | Schottle | .................... E21B 7/06 166/244.1 |
| 9,286,437 | B2 | 3/2016 | Colvin et al. | |
| 2005/0278123 | A1 | 12/2005 | Alft et al. | |
| 2007/0223822 | A1* | 9/2007 | Haugland | ............ G01V 11/002 382/232 |
| 2008/0120035 | A1* | 5/2008 | Hassan | ................... G01B 21/22 702/10 |
| 2009/0194333 | A1 | 8/2009 | MacDonald et al. | |
| 2009/0260823 | A1* | 10/2009 | Prince-Wright | ....... C10G 21/22 166/302 |
| 2013/0073209 | A1* | 3/2013 | Colvin | ................ E21B 43/2406 702/11 |
| 2017/0030180 | A1* | 2/2017 | Maurer | ..................... E21B 7/04 |

OTHER PUBLICATIONS

*U.S. Appl. No. 13/635,315, Notice of Allowance dated Nov. 6, 2015, 5 pages.
*U.S. Appl. No. 15/015,752, Notice of Allowance dated Nov. 22, 2016, 10 pages.
*Canadian Patent Application No. 2,792,836, Office Action dated Oct. 24, 2016, 4 pages.
*European Patent Application No. 10848086.4, European Search Report dated Mar. 22, 2017, 9 pages.
Chinese Patent Application No. 201080065528,7, Office Action dated Feb. 11, 2015, 3 pages.
Eurasian Patent Application No. 201201285/31, Office Action dated Mar. 31, 2015, 2 pages.
Egyptian Patent Application No. PCT/NA/1480/2012, Primary Examination Report dated Mar. 3, 2014, 5 pages.
International Patent Application No. PCT/US2010/00774, International Search Report & Written Opinion dated May 24, 2010, 8 pages.
International Patent Application No. PCT/US2010/00774, International Preliminary Report on Patentability dated May 16, 2012, 25 pages.

* cited by examiner

SYSTEMS AND METHODS FOR POSITIONING HORIZONTAL WELLS WITHIN BOUNDARIES

CROSS-REFERENCE TO RELATED APPLICATIONS

This is a continuation of U.S. patent application Ser. No. 15/015,752 filed Feb. 4, 2016 (allowed), which is a continuation of U.S. patent application Ser. No. 13/635,315 filed Nov. 27, 2012 (U.S. Pat. No. 9,286,437), which is a U.S. national phase under 35 U.S.C. 371 of International Patent Application No. PCT/US2010/000774, filed Mar. 15, 2010, the contents of which are incorporated herein by reference.

STATEMENT REGARDING FEDERALLY SPONSORED RESEARCH

Not applicable.

FIELD OF THE INVENTION

The present invention generally relates to systems and methods for positioning horizontal laterals within boundaries. More particularly, the present invention relates to an automated process of creating targets for horizontal laterals in order to position the horizontal laterals within boundaries.

BACKGROUND OF THE INVENTION

In today's oil and gas industry, wells that are deviated are most common and more often than not, deviated to horizontal—meaning an inclination of about 75-90 degrees. There are a number of established plays that utilize mass planning and targeting for horizontal drilling like the SAGD (steam assisted gravity drainage) in Canada and the Marcellus, Hornriver and Barnett shale gas plays. In order to optimize the number of wells to completely exploit one of these plays, companies are planning hundreds, and in some case thousands, of wells for an entire asset in a defined area, which is often very time-consuming and requires numerous resources. There are therefore, numerous types of resource plays that require horizontal laterals to be positioned and spaced to fill either a regular or irregular shape lease or unit boundary. Two specific plays that utilize the placement of horizontal laterals are shale and heavy oil plays. The objective is to maximize the coverage within this area based on lateral constraints, such as min/max lateral lengths, lateral spacing and heel/toe, heel/heel or toe/toe spacing. In SAGD (Steam Assisted Gravity Drainage) applications, these laterals are in pairs with the upper lateral being the steam injector and the lower lateral being the oil producer. Companies often rely on conventional technology to help accomplish this objective and as a result are often limited with respect to the number of scenarios that can be analyzed. Once the drilling operation has commenced and information from wells being drilled are coming in from the field, engineers, once again, rely on conventional technology to update the plan based on actual data and are limited in their options for redistributing the remaining laterals. This process can easily take months to complete depending on the size of the field and the number of wells that are being planned.

There is therefore, a need for a more efficient process that will significantly reduce the cost of p7lanning horizontal wells by reducing the time to plan their horizontal laterals within a limited pre-defined boundary while addressing the same concerns addressed in the conventional process.

SUMMARY OF THE INVENTION

The present invention therefore, meets the above needs and overcomes one or more deficiencies in the prior art by providing systems and methods for creating targets for horizontal wells within a limited predefined boundary based upon different patterns for the horizontal wells.

In one embodiment, the present invention includes a method for determining subsurface target locations within a predetermined boundary, which comprises: i) computing an azimuth and an offset distance based on a point at a total depth for a reference well within the predetermined boundary; ii) creating a line that is perpendicular to the azimuth and passes through a center location of the predetermined boundary; iii) creating a point on the line at a maximum distance from the center location within the predetermined boundary; iv) creating a series of points along the line beginning at the offset distance from the point on the line and passing through the center location until reaching twice the maximum distance; and v) computing a list of heel/toe pairs for each point in the series of points using a computer processor and adding the list for each point in the series of points to a collection of lists comprising heel/toe pairs as each list is computed, the collection of lists representing the target locations within the predetermined boundary.

In another embodiment, the present invention includes a non-transitory program carrier device tangibly carrying computer executable instructions for determining subsurface target locations within a predetermined boundary, the instructions being executable to implement: i) computing an azimuth and an offset distance based on a point at a total depth for a reference well within the predetermined boundary; ii) creating a line that is perpendicular to the azimuth and passes through a center location of the predetermined boundary; iii) creating a point on the line at a maximum distance from the center location within the predetermined boundary; iv) creating a series of points along the line beginning at the offset distance from the point on the line and passing through the center location until reaching twice the maximum distance; and v) computing a list of heel/toe pairs for each point in the series of points and adding the list for each point in the series of points to a collection of lists comprising heel/toe pairs as each list is computed, the collection of lists representing the target locations within the predetermined boundary.

In yet another embodiment, the present invention includes a method for determining subsurface target locations within a predetermined boundary, which comprises: a) selecting an azimuth range comprising at least one predetermined azimuth; b) selecting an offset distance range comprising at least one predetermined offset distance; c) creating a line that is perpendicular to at least one predetermined azimuth within the azimuth range and passes through a center location of the predetermined boundary; d) creating a point on the line at a maximum distance from the center location within the predetermined boundary; e) creating a series of points along the line that begin at the at least one predetermined offset distance within the offset distance range from the point and pass through the center location until reaching twice the maximum distance; f) computing a list of heel/toe pairs for each point in the series of points and adding the list for each point in the series of points to a collection of lists comprising heel/toe pairs as each list is computed; g) repeating c)-f) for each predetermined azimuth within the azimuth range and for each predetermined offset distance within the offset distance range; and h) determining the best collection of lists representing the target locations within the predetermined boundary.

In yet another embodiment, the present invention includes a non-transitory program carrier device tangibly carrying computer executable instructions for determining subsurface target locations within a predetermined boundary, the instructions being executable to implement: a) selecting an azimuth range comprising at least one predetermined azimuth; b) selecting an offset distance range comprising at least one predetermined offset distance; c) creating a line that is perpendicular to at least one predetermined azimuth within the azimuth range and passes through a center location of the predetermined boundary; d) creating a point on the line at a maximum distance from the center location within the predetermined boundary; e) creating a series of points along the line that begin at the at least one predetermined offset distance within the offset distance range from the point and pass through the center location until reaching twice the maximum distance; f) computing a list of heel/toe pairs for each point in the series of points and adding the list for each point in the series of points to a collection of lists comprising heel/toe pairs as each list is computed; g) repeating c)-f) for each predetermined azimuth within the azimuth range and for each predetermined offset distance within the offset distance range; and h) determining the best collection of lists representing the target locations within the predetermined boundary.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like referenced numerals, and in which.

DETAILED DESCRIPTION OF THE PREFERRED EMBODIMENTS

The subject matter of the preferred embodiments is described with specificity however, is not intended to limit the scope of the invention. The subject matter thus, might also be embodied in other ways to include different steps, or combinations of steps, similar to the ones described herein, in conjunction with other present or future technologies. Although the term "step" may be used herein to describe different elements of methods employed, the term should not be interpreted as implying any particular order among or between various steps herein disclosed unless otherwise expressly limited by the description to a particular order. While the following description refers to oil and gas wells, the systems and methods of the present invention are not limited thereto and may also be applied to other industries to achieve similar results.

Method Description

The present invention addresses several key areas for positioning targets for horizontal wells within a limited pre-defined boundary. The first assumes pads/platforms can be positioned anywhere, i.e. flat lands, little to no environmental restrictions, non-populated areas, etc. In this case, boundaries can be filled to maximize coverage. In mountainous areas where there are grade/relief issues, or in environmentally sensitive or heavily populated areas, the positioning of pads is limited and often fixed. In this case, the present invention will maximize the lateral coverage based on the fixed positioning of pads. It is also common when doing horizontal design work to have at least one well already drilled that establishes a pattern that the rest of the wells must match. This often happens with the acquisition of actual data which invalidates the current planned horizontal lateral configuration (i.e. spacing and/or lengths). In other cases, there may be no previously drilled wells, but an exact azimuth that must be used. In yet other cases, there is a general knowledge of the desired azimuth, but some flexibility over the exact azimuth. The present invention allows for various combinations of these situations to be honored when positioning targets for horizontal wells.

Figure 1:
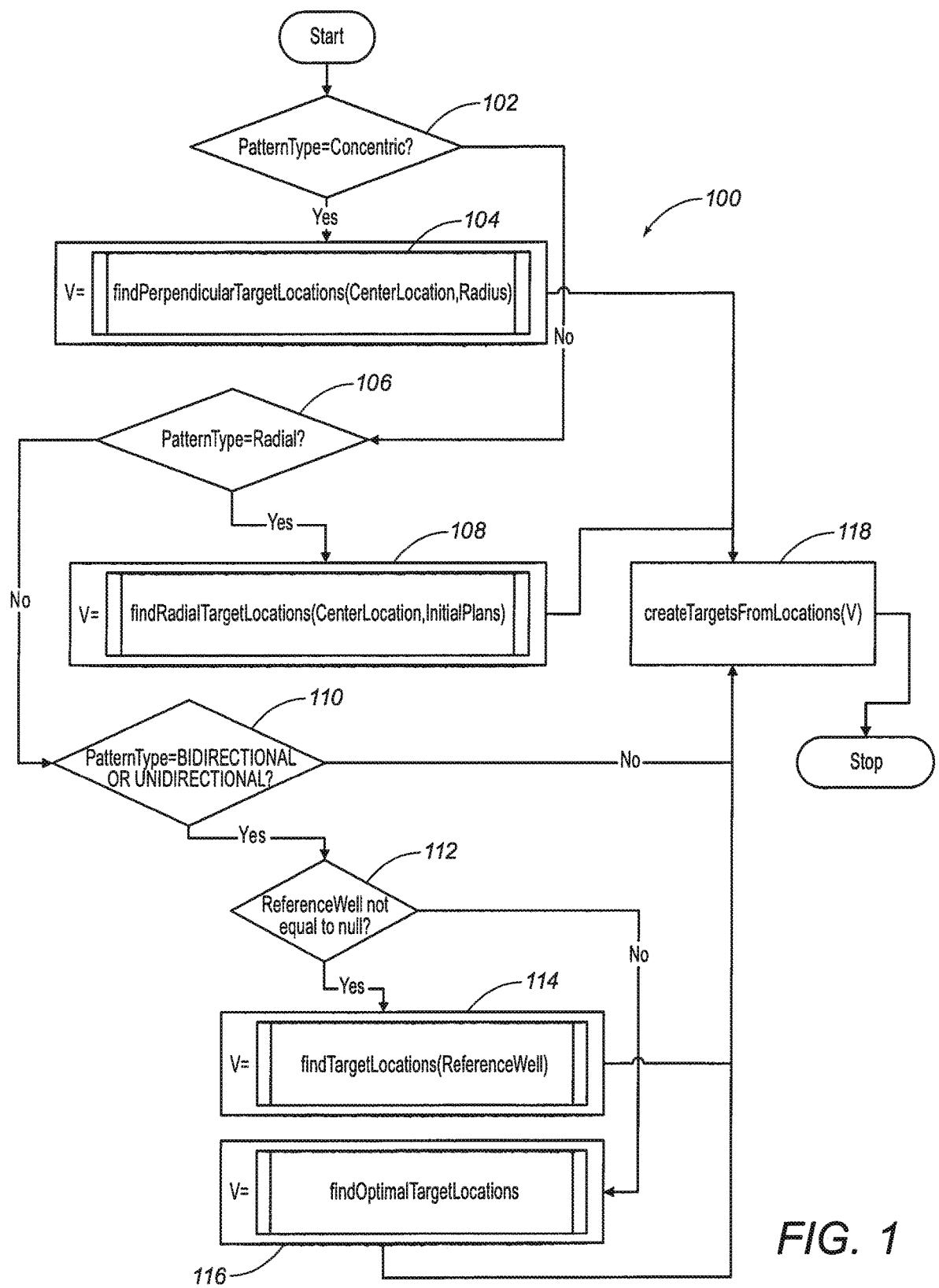
FIG. 1 is a flowchart illustrating one embodiment of a method for implementing the present invention.

Referring now to FIG. 1, a flowchart of one embodiment of a method for implementing the present invention is illustrated. The method 100 generally illustrates a workflow for determining which algorithm to use for creating targets for horizontal wells based upon a particular pattern and/or criteria. Four pattern types of horizontal targets can be generated. A concentric pattern orients horizontal target pairs tangentially around a circular shape. A radial pattern orients horizontal target pairs outward but perpendicular to a circular shape. A unidirectional pattern forces target pairs to adhere to a Heel-Toe Heel-Toe scheme whereas a bidirectional pattern forces target pairs to adhere to a Toe Heel Heel Toe scheme. Heel is used to refer to the entry point (or landing point) of the horizontal section whereas the Toe is used to indicate the termination of the horizontal well or endpoint of the horizontal lateral. After the preferred algorithm is determined, the method 100 reduces a collection of pairs of target (x,y) locations, which may then be processed by a method well known in the art for creating horizontal laterals from the location pairs (targets). Targets are just points that, when connected, form a horizontal lateral section. This horizontal lateral section, when connected to the origin by some trajectory, is commonly referred to as a horizontal well. Therefore, a horizontal lateral is just an incomplete horizontal well (thus, a stub). V, which is used in reference to FIG. 1 and other related figures, is a collection of collections of target locations and may also be referred to as a single collection, a set or an array of points. The individual collections each represent one or more pairs of target locations so there will always be an even number of them.

In step 102, the method 100 determines if the pattern type is concentric. If the pattern type is concentric, then go to step 104. If the pattern type if not concentric, then go to step 106.

Figure 2:
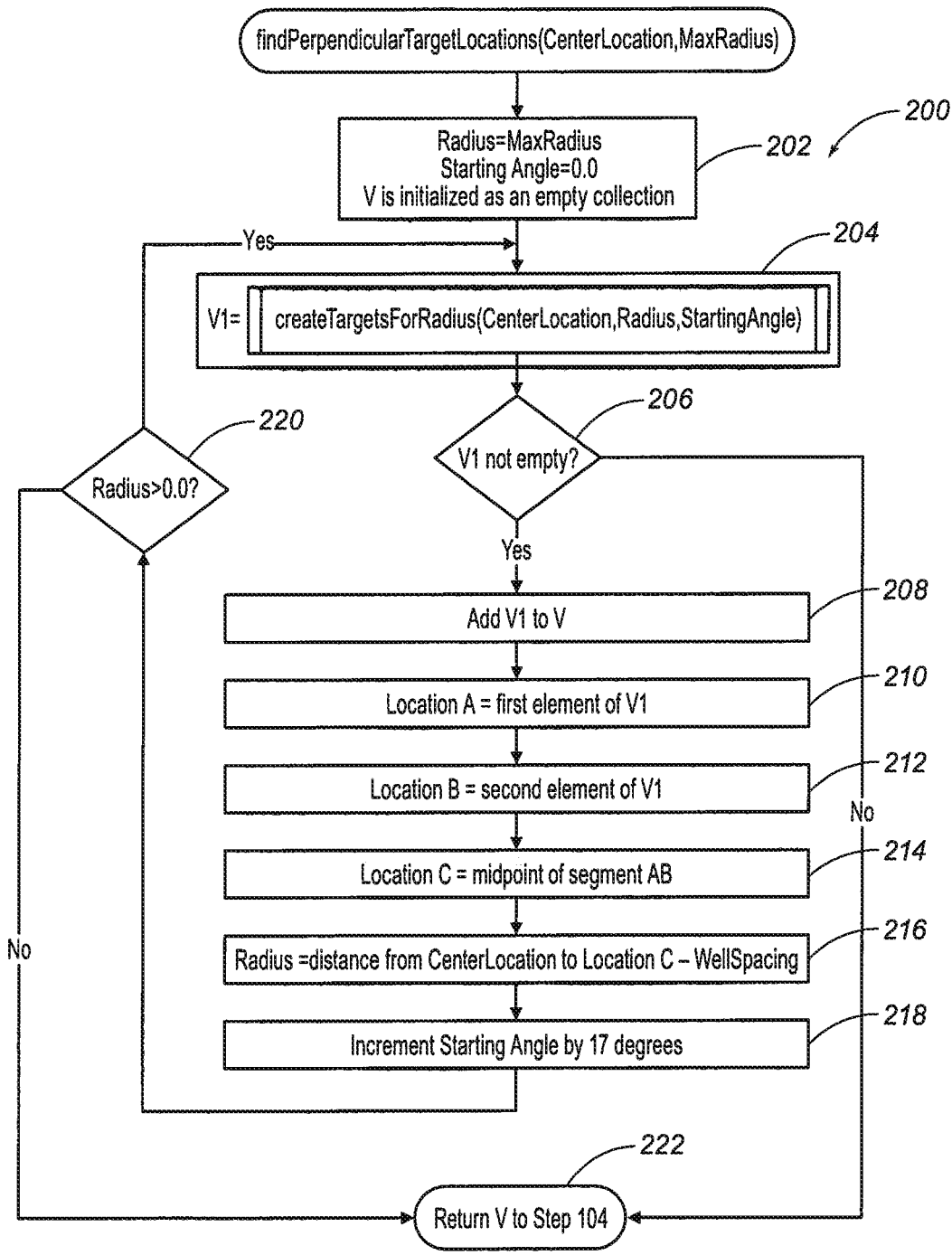
FIG. 2 is a flowchart illustrating one embodiment of an algorithm for performing step 104 in FIG. 1.

In step 104, V is set equal to "findPerpendicularTargetLocations(Center Location,Radius)." The algorithm "findPerpendicularTargetLocations(CenterLocation, Radius)" is illustrated in FIG. 2.

In step 106, the method 100 determines if the pattern type is radial. If the pattern type is radial, then go to step 108. If the pattern type is not radial, then go to step 110.

Figure 7:
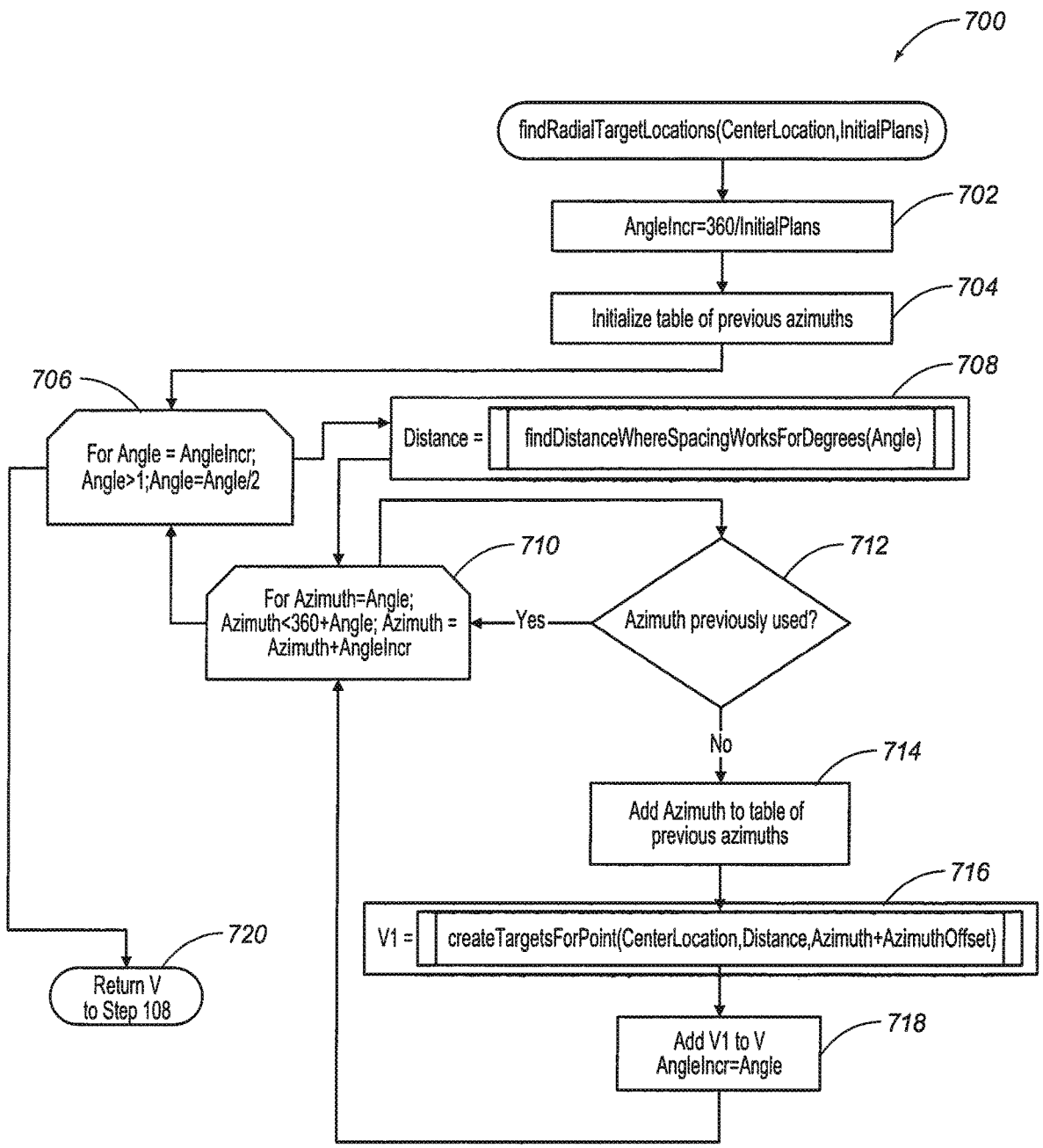
FIG. 7 is a flowchart illustrating one embodiment of the algorithm for performing step 108 in FIG. 1.

In step 108, V is set equal to "findRadialTargetLocations (CenterLocation,Initial Plans)." The algorithm "findRadialTargetLocations(CenterLocation,InitialPlans)" is illustrated in FIG. 7.

In step 110, the method 100 determines if the pattern type is bidirectional or unidirectional. If the pattern type is bidirectional or unidirectional, then go to step 112. If the pattern type is not bidirectional or unidirectional, then go to step 118.

In step 112, the method 100 determines if the reference well is not equal to null. If the reference well is not equal to null, then go to step 114. If the reference well is equal to null, then go to step 116. Step 112 therefore, determines if the bidirectional or unidirectional pattern is required to line up with a reference well. If the pattern is required to line up on a reference well, then the algorithm in step 114 is called with that reference well. If the pattern is not required to line up on a reference well, then the algorithm in step 116 is called to determined which offset and azimuth provides the best coverage.

Figure 10:
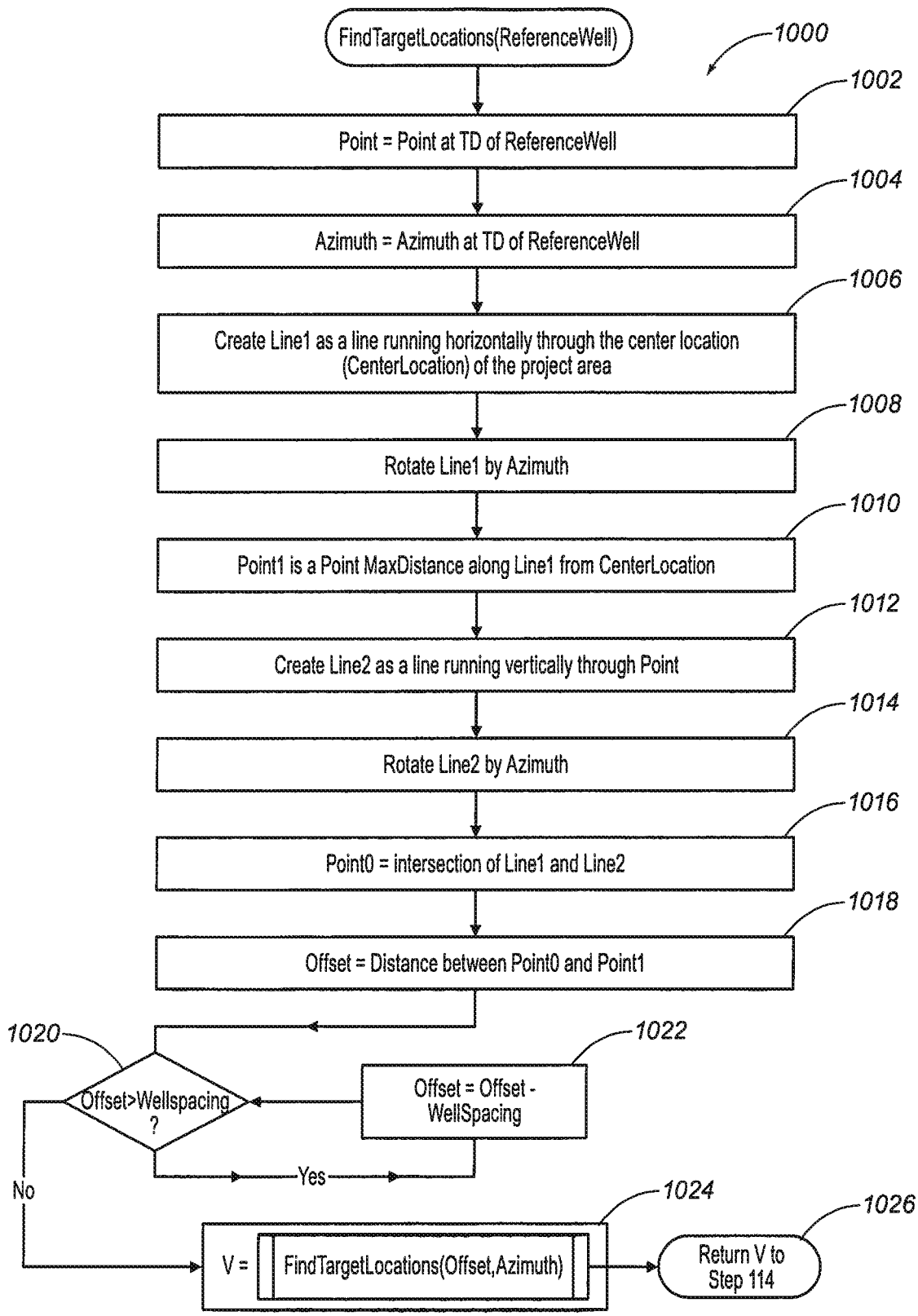
FIG. 10 is a flowchart illustrating one embodiment of an algorithm for performing step 114 in FIG. 1.

In step 114, V is set equal to "findTargetLocations(ReferenceWell)." The algorithm "findTargetLocations(ReferenceWell)" is illustrated in FIG. 10.

Figure 13:
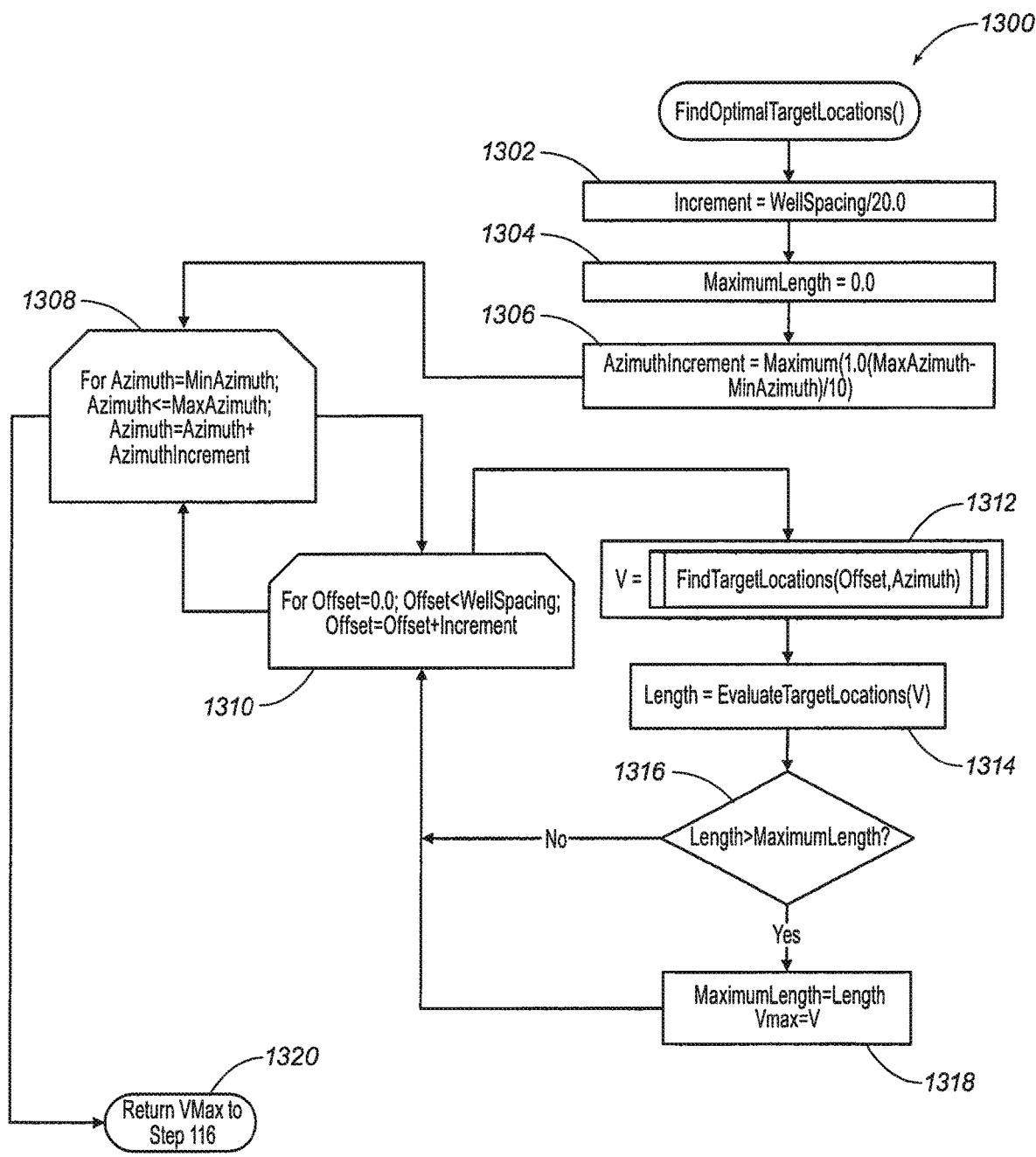
FIG. 13 is a flowchart illustrating one embodiment of an algorithm for performing step 116 in FIG. 1.

In step 116, V is set equal to "findOptimalTargetLocations." The algorithm "findOptimalTargetLocations" is located in FIG. 13.

Figure 20:
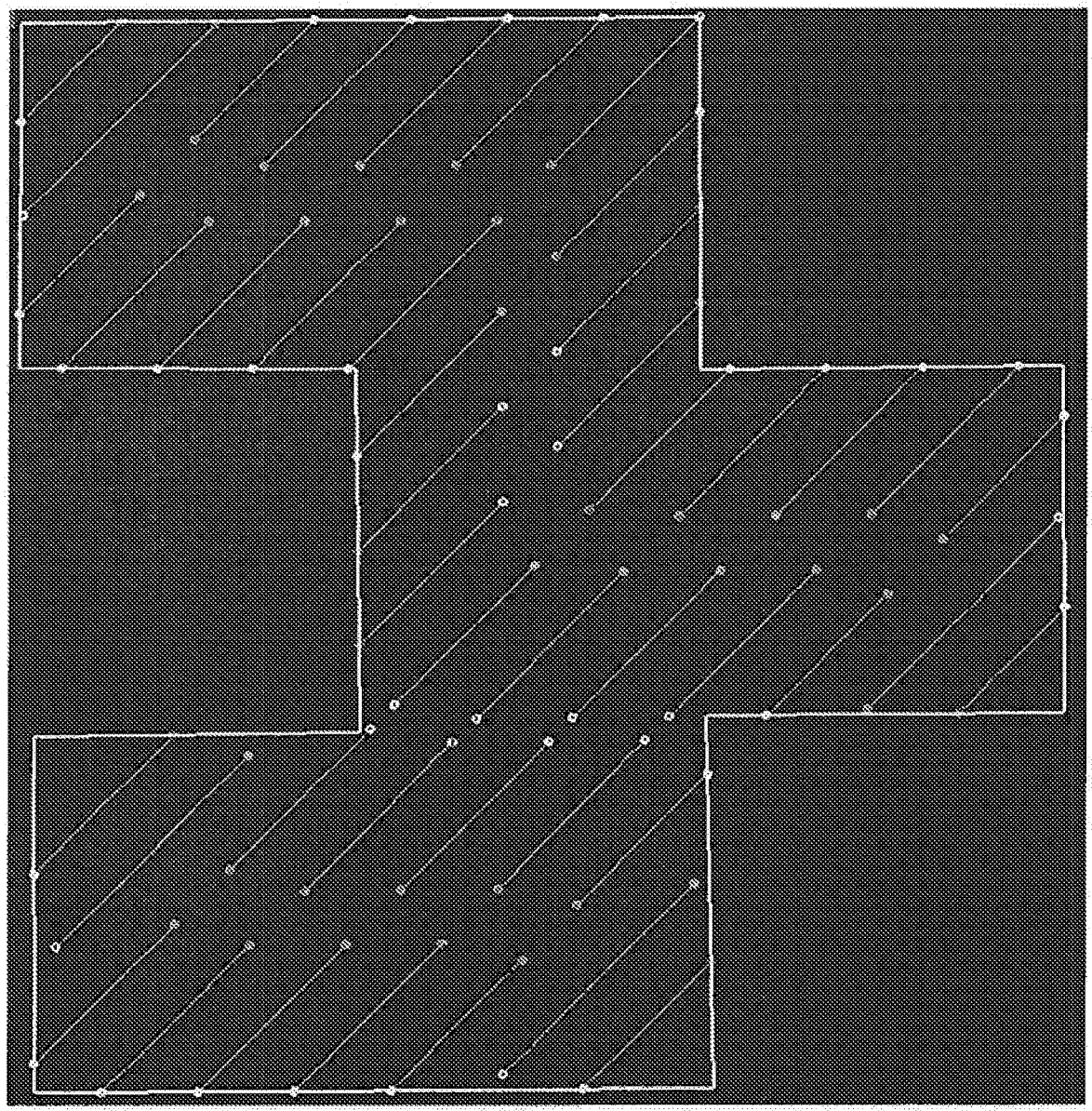
FIG. 20 is a plan view of an irregular boundary filled in with horizontal targets connected by horizontal laterals.

In step 118, any method well known in the art for creating targets from the location pairs calculated in steps 104, 108, 114 or 116 may be used. An exemplary illustration of what the results might look like after performing steps 116 and 118 is shown in FIG. 20, which is a plan view of an irregular boundary filled in with horizontal targets connected by horizontal laterals. It is clear that the pattern type is bidirectional and the reference well was null according to step 112.

Creating Targets for Horizontal Laterals in Concentric Patterns

Referring now to FIG. 2, one embodiment of the "findPerpendicularTarget Locations(CenterLocation,MaxRadius)" algorithm for step 104 in FIG. 1 is illustrated. The method 200 generally creates collections of the location pairs in concentric circles, starting at the maximum radius and working inward until no target location pairs are produced.

In step 202, Radius is set equal to MaxRadius, Starting Angle is set equal to zero and V is initialized as an empty collection.

Figure 3:
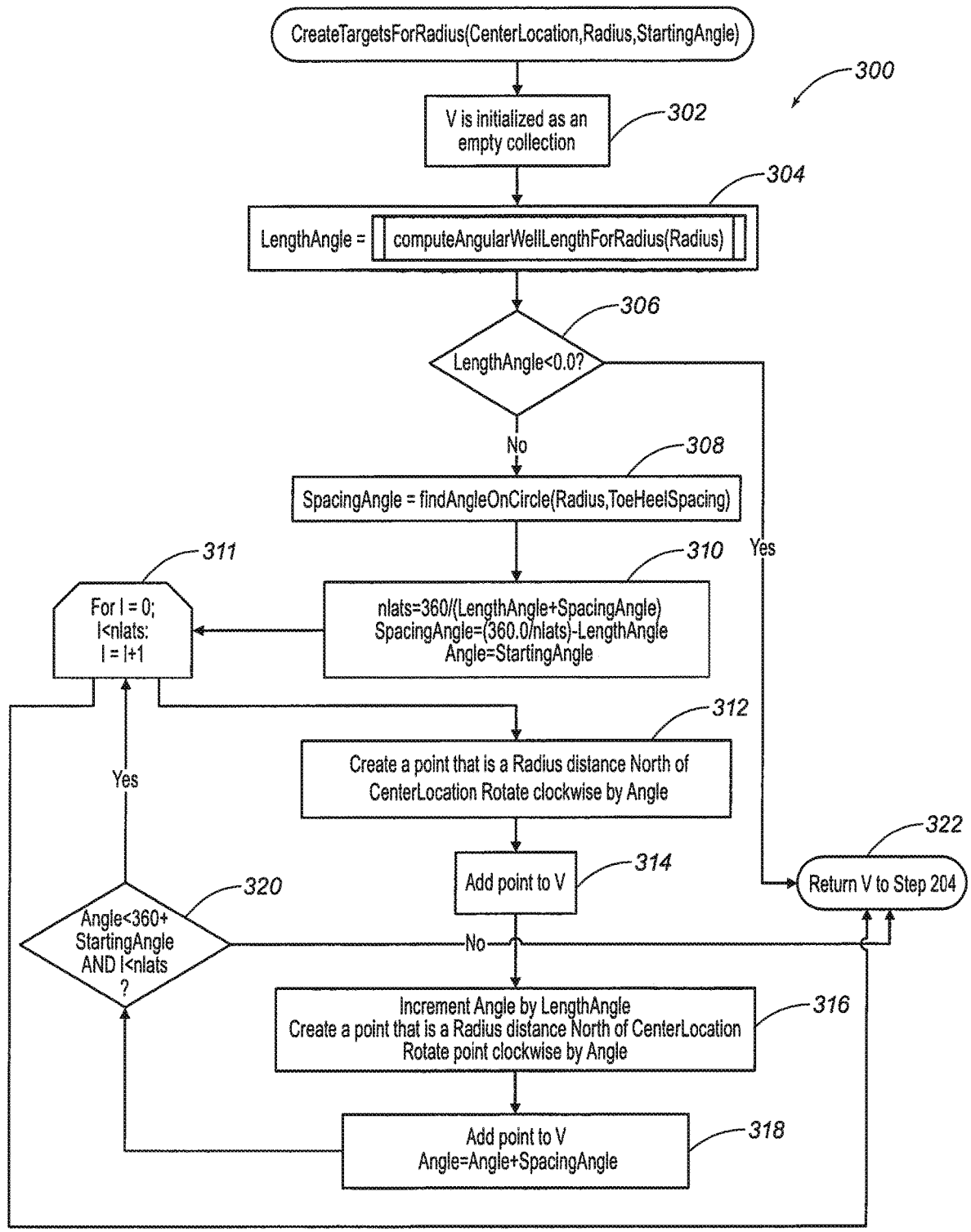
FIG. 3 is a flowchart illustrating one embodiment of the algorithm for step 204 in FIG. 2.

In step 204, V1 is set equal to "createTargetsForRadius (CenterLocation,Radius, StartingAngle)." The algorithm "createTargetsForRadius(CenterLocation,Radius,StartingAngle)" is illustrated in FIG. 3.

In step 206, the method 200 determines if V1 is not empty. If V1 is not empty, then go to step 208. If V1 is empty, then go to step 222.

In step 208, V1 is added to V.

In step 210, Location A is set equal to the first element of V1.

In step 212, Location B is set equal to the second element of V1.

In step 214, Location C is set equal to the midpoint of segment AB.

In step 216, Radius is set equal to the distance from CenterLocation to Location C-WellSpacing. In steps 210-216, the next radius inward is computed by taking the midpoint of a straight line between the first two points in the collection of location pairs and computing the distance from the CenterLocation, which represents a predetermined location for the pattern to be centered upon, to location C and subtracting the preferred WellSpacing distance. In this manner, no point on a well in one of the concentric circles will be closer than the desired WellSpacing to any point on a well in one of the other concentric circles.

In step 218, Starting Angle is incremented by 17 degrees. In this manner, the wells in the concentric circles will overlap each other by not having a common starting point. Although 17 degrees is used because it is a prime number that does not divide into 360, other numbers may work equally well.

In step 220, the method 200 determines if the Radius is greater than zero. If the Radius is greater than zero, then go to step 204 where the method 200 is repeated from step 204. If the Radius is not greater than zero, then go to step 222.

In step 222, the method 200 returns V to step 104 in FIG. 1.

Referring now to FIG. 3, one embodiment of the "CreateTargetsForRadius (CenterLocation,Radius,StartingAngle)" algorithm for step 204 in FIG. 2 is illustrated. The method 300 computes a well length and spacing length in degrees rather than distance. For the spacing length, this would be the angle of an arc whose chord would be the desired spacing distance of that radius. For the well length, the calculations are more complex because the actual well length can vary. Once the two angular values have been determined in steps 304 and 308, it is a simple matter of creating points around a circle—beginning with StartingAngle and proceeding around 360 degrees until the next point returns to the starting location. The angular distance would increase alternating between the angular well length and the angular spacing distance.

In step 302, V is initialized as an empty collection.

Figure 4:
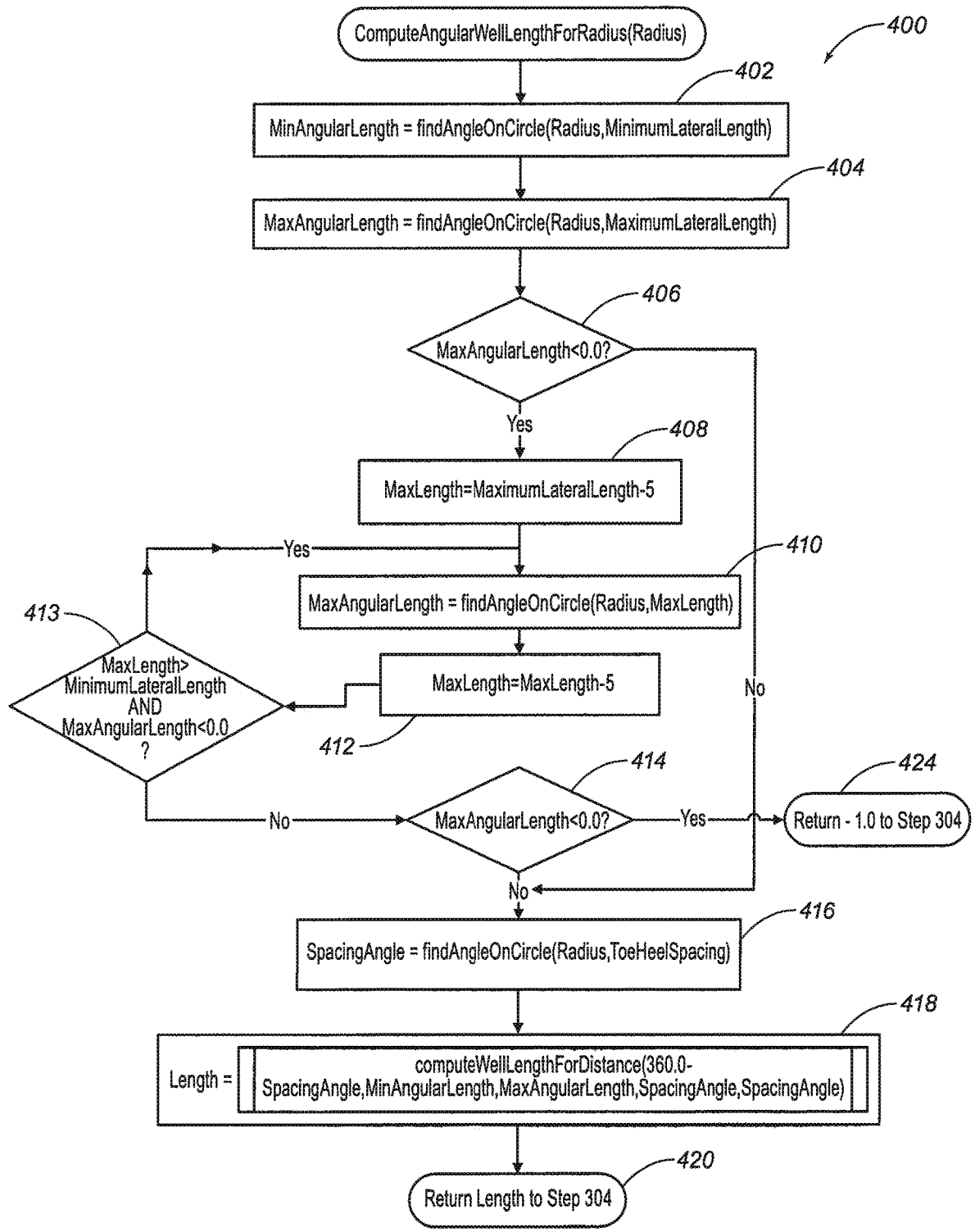
FIG. 4 is a flowchart illustrating one embodiment of the algorithm for step 304 in FIG. 3.

In step 304, LengthAngle is set equal to "computeAngularWellLengthFor Radius(Radius)." The algorithm "computeAngularWellLengthForRadius(Radius)" is illustrated in FIG. 4.

In step 306, the method 300 determines if LengthAngle is less than zero. If LengthAngle is less than zero, which represents an error condition, then go to step 322. If LengthAngle is not less than zero, then go to step 308.

In step 308, SpacingAngle is set equal to "findAngleOnCircle(Radius,ToeHeel Spacing)" using the angle of an arc whose chord would be the desired spacing distance at that radius.

In step 310, nlats is set equal to 360/(LengthAngle+SpacingAngle), Spacing Angle is set equal to (360/nlats)−LengthAngle and Angle is set equal to StartingAngle. In this manner, the number of laterals that can be created is equal to 360/(the angular length of one lateral+the angular spacing distance). If, for example, each lateral was 17 degrees of the circle and there was a three degree spacing between laterals, then for a full circle, there would be 18 laterals (360/(17+3)=18). Because the spacing angle is approximate, an exact value for SpacingAngle may be obtained by dividing 360 by the integer number of laterals and subtracting angular length from that result. If, instead, the angular length of the laterals was 16.8, then the SpacingAngle would be 3.2 so that the combination would result in an even 360 degrees.

In step 311, variable I is initialized to equal zero. If I is less than nlats, then increase I by 1 and go to step 312. If I is not less than nlats, then go to step 322. Nlats is the number of laterals that were computed in step 310. Therefore, the loop is repeated nlats number of times.

In step 312, create a point Radius distance North of CenterLocation and rotate it clockwise by Angle. In this manner, a point is created that is a specified number of degrees clockwise from North of another point and a certain distance along that vector.

In step 314, the point created in step 312 is added to V.

In step 316, increment Angle by LengthAngle and create a point that is a Radius distance North of CenterLocation and rotate it clockwise by Angle. In this manner, a point is created that is a specified number of degrees clockwise from North of another point and a certain distance along that vector.

In step 318, the point created in step 316 is added to V and Angle is set equal to Angle+SpacingAngle. Angle is the current angle (i.e., the angle at which the last point was created) and SpacingAngle is the preferred amount of movement around the circle before creating the next point.

In step 320, the method 300 determines if Angle is less than 360 degrees+the StartingAngle and I is less than nlats. If Angle is less than 360+the StartingAngle and I is less than nlats, then go to step 311 where the method 300 repeats at step 312 until the conditions in step 311 are no longer met. If Angle is not less than 360+the StartingAngle and I is not less than nlats, then go to step 322.

In step 322, the method 300 returns V to step 204 in FIG. 2.

Referring now to FIG. 4, one embodiment of the "ComputeAngularWellLength ForRadius(Radius)" algorithm for step 304 in FIG. 3 is illustrated. In general the method 400 converts minimum lateral length, maximum lateral length and toe heel spacing from distances to angles through a chord to angle calculation.

In step 402, MinAngularLength is set equal to find AngleOnCircle(Radius, MinimumLateralLength) using techniques well known in the art. Find AngleOnCircle represents an angle equal to 2*arcsine (chord distance/(2*radius)).

In step 404, MaxAngularLength is set equal to findAngleOnCircle(Radius, MaximumLateralLength) using techniques well known in the art.

In step 406, the method 400 determines if MaxAngularLength is less than zero. If MaxAngularLength is less than zero, then go to step 408. If MaxAngularLength is not less than zero, then go to step 416.

In step 408, MaxLength is set equal to MaximumLateralLength−5.

In step 410, MaxAngularLength is set equal to findAngleOnCircle(Radius,Max Length) using techniques well known in the art.

In step 412, MaxLength is set equal to MaxLength−5.

In step 413, the method 400 determines if MaxLength is greater than Minimum LateralLength and if MaxAngularLength is less than zero. If MaxLength is greater than MiniumLateralLength and MaxAngularLength is less than zero, then go to step 410 where the method 400 is repeated from step 410. If MaxLength is not greater than MinimumLateralLength and MaxAngularLength is not less than zero, then go to step 414.

In step 414, the method 400 determines if MaxAngularLength is less than zero. If MaxAngularLength is less than zero, then go to step 424. If MaxAngularLength is not less than zero, then go to step 416. The process in steps 406 through 414 addresses situations where, for a particular radius, maximum lateral length is too long to convert to a chord length. When this happens, the method 400 keeps subtracting from maximum length until either an angular length can be computed or maximum length is less than or equal to minimum lateral length.

In step 416, SpacingAngle is set equal to findAngleOnCircle(Radius,ToeHeel Spacing) using techniques well known in the art.

Figure 6:
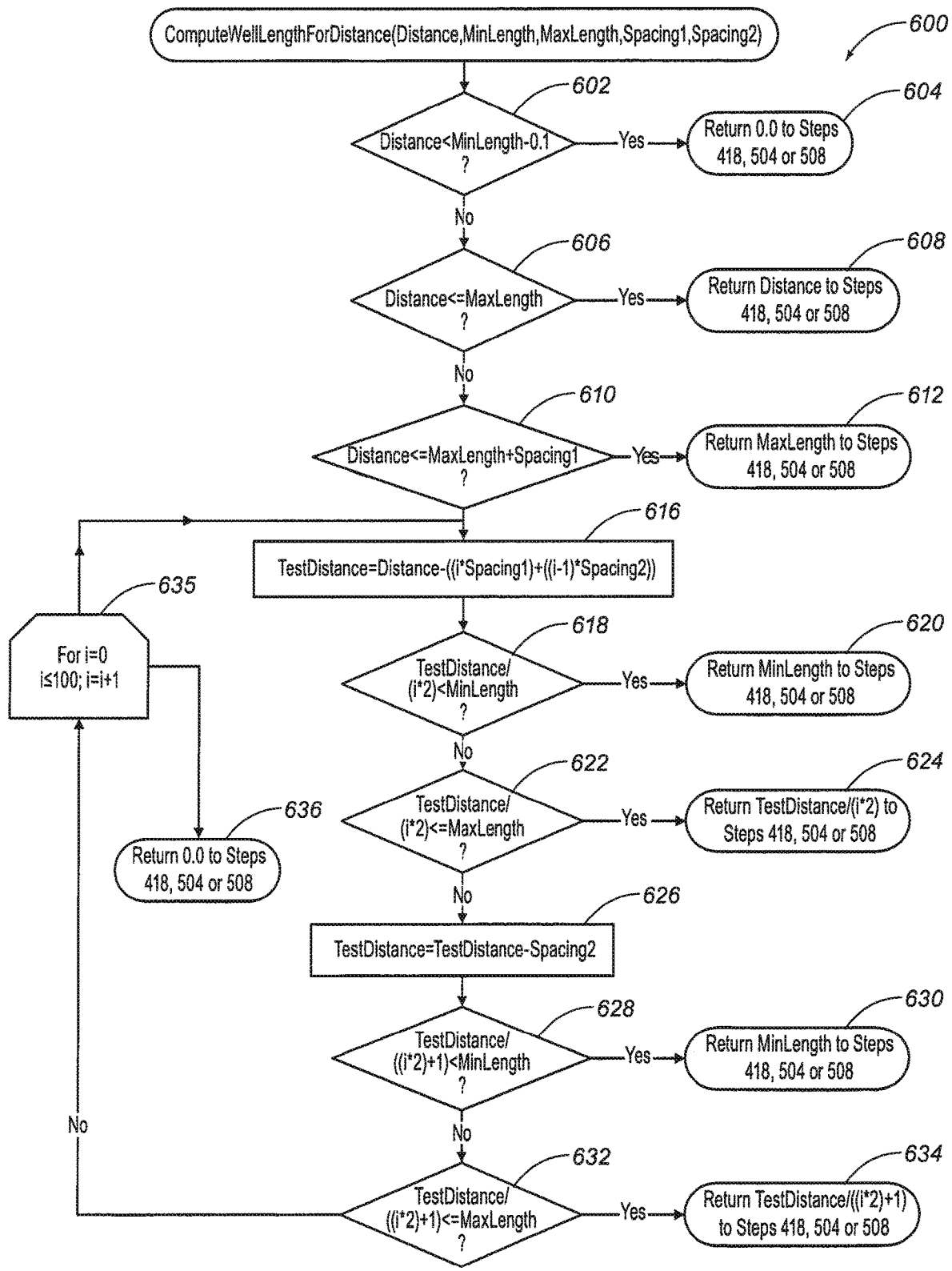
FIG. 6 is a flowchart illustrating one embodiment of the algorithm for step 418 in FIG. 4 and steps 504, 508 in FIG. 5.

In step 418, Length is set equal to "computeWellLengthForDistance(360.0−SpacingAngle,MinAngularLength, MaxAngularLength,SpacingAngle,SpacingAngle)." The algorithm "computeWellLengthForDistance(360.0−SpacingAngle,MinAngular Length,MaxAngularLength,SpacingAngle,SpacingAngle)" is illustrated in FIG. 6.

In step 420, the method 400 returns Length to step 304 in FIG. 3.

In step 424, the method 400 returns −1 to step 304 in FIG. 3.

Figure 5:
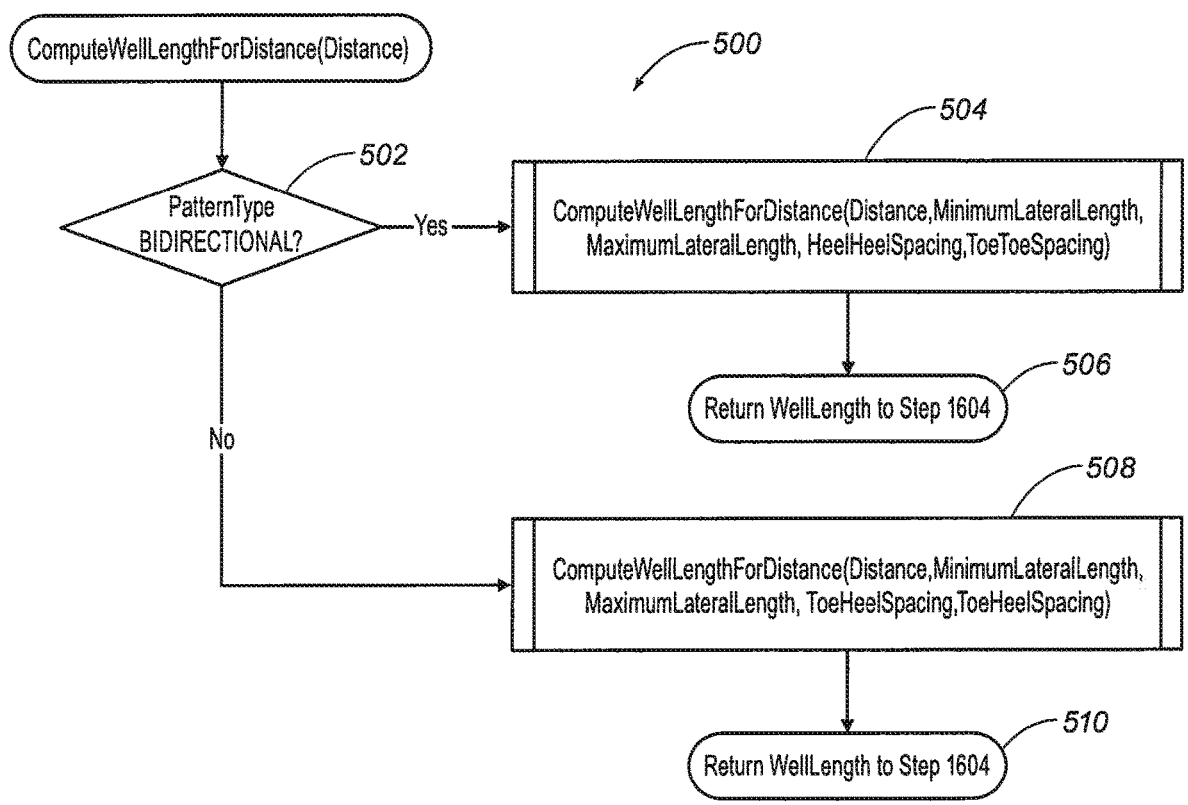
FIG. 5 is a flowchart illustrating one embodiment of the algorithm for step 1604 in FIG. 16.

Referring now to FIG. 6, one embodiment of the "ComputeWellLengthFor Distance(Distance,MinLength,MaxLength,Spacing1,Spacing2)" algorithm for step 418 in FIG. 4 and steps 504, 508 in FIG. 5 is illustrated. The method 600 is generally used to calculate the best well length to use to fill a particular distance, given a minimum and a maximum possible length and two spacing distances that should be used in alternating fashion. Although the distances are normally actual distances, angles may be used as well.

In step 602, the method 600 determines if Distance is less than MinLength−Point1. If Distance is less than MinLength−Point1, then go to step 604. If Distance is not less than MinLength−Point1, then go to step 606.

In step 604, the method 600 returns zero to steps 418, 504 or 508.

In step 606, the method 600 determines if Distance is less than or equal to Max Length. If Distance is less than or equal to MaxLength, then go to step 608. If Distance is not less than or equal to MaxLength, then go to step 610.

In step 608, the method 600 returns Distance to steps 418, 504 or 508.

In step 610, the method 600 determines if Distance is less than or equal to Max Length+Spacing1. If Distance is less than or equal to MaxLength+Spacing1, then go to step 612. If Distance is not less than or equal to MaxLength+Spacing1, then go to step 616.

In step 612, the method 600 returns MaxLength to steps 418, 504 or 508.

Steps 602 through 612 are used to handle situations where the distance to be filled is smaller than the maximum length+the first spacing value. The method 600 generally assumes that there will be pairs of laterals, each of the same length and each pair of laterals will be separated from itself by Spacing1 and separated from the next pair of laterals by Spacing2.

In step 616, TestDistance is set equal to Distance−((i*Spacing1)+((i−1)*Spacing 2)). The computation in step 616 starts with successive numbers of paired laterals (from one up) by first subtracting all the spacing that would be required. Length checks are then performed in steps 618 through 634. If the distance, with the spacing removed divided by the number of pairs (*2) is smaller than the maximum length, then it will be used or the minimum length will be used if it is actually smaller.

In step 618, the method 600 determines if TestDistance/(i*2) is less than Min Length. If TestDistance/(i*2) is less than MinLength, then go to step 620. If Test Distance/(i*2) is not less than MinLength, then go to step 622.

In step 620, the method returns MinLength to steps 418, 504 or 508.

In step 622, the method 600 determines if TestDistance/(i*2) is less than or equal to MaxLength. If TestDistance/(i*2) is less than or equal to MaxLength, then go to step 624. If TestDistance/(i*2) is not less than or equal to MaxLength, then go to step 626.

In step 624, the method 600 returns TestDistance/(i*2) to steps 418, 504 or 508.

In step 626, TestDistance is set equal to TestDistance−Spacing2. In steps 626 through 634, the assumption is made that there will not be an even number of laterals, and the last one will be only half of a pair (i.e. "i" pairs+one extra).

In step 628, the method 600 determines if TestDistance/((i*2)+1) is less than MinLength. If TestDistance/((i*2)+1) is less than MinLength, then go to step 630. If TestDistance/((i*2)+1) is not less than MinLength, then go to step 632.

In step 630, the method 600 returns MinLength to steps 418, 504 or 508.

In step 632, the method 600 determines if TestDistance/((i*2)+1) is less than or equal to MaxLength. If TestDistance/((i*2)+1) is less than or equal to MaxLength, then go to step 634. If TestDistance/((i*2)+1) is not less than or equal to MaxLength, then go to step 635.

In step 630, the method 600 returns TestDistance/((i*2)+1) to steps 418, 504 or 508.

In step 635, variable i is initialized to equal zero. If i is less than or equal to 100, then increase i by one and go to step 616. If i is not less than or equal to 100, then go to step 636. The variable (i) represents the number of laterals that will fill up a predetermined linear distance.

In step 636, the method 600 returns zero to steps 418, 504 or 508.

Creating Targets for Horizontal Laterals in Radial Patterns

Referring now to FIG. 7, one embodiment of the "findRadialTargetLocations (CenterLocation,InitialPlans)" algorithm for step 108 in FIG. 1 is illustrated.

In step 702, AngleIncr is set equal to 360/InitialPlans. The InitialPlans is a predetermined initial number of plans (i.e. the size of the first set of plans radiating outwards), which is used to divide into 360 to obtain the initial angle increment.

In step 704, a table of previous azimuths is initialized in order to keep from using the same azimuth multiple times.

In step 706, Angle is initialized to equal AngleIncr. If Angle is greater than one, then divide Angle by two and go to step 708. If Angle is not greater than one, then go to step 720. AngleIncr is the initial separation between laterals. With each pass in the loop, Angle (the current separation) will be reduced in half. One (1) degree is used as a cutoff, but it could be another preferred number.

Figure 8:
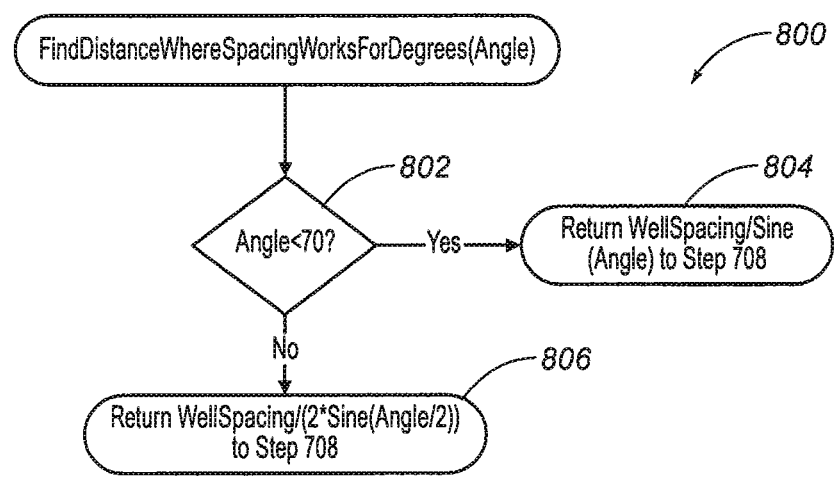
FIG. 8 is a flowchart illustrating one embodiment of the algorithm for step 708 in FIG. 7.

In step 708, Distance is set equal to "findDistanceWhereSpacingWorksFor Degrees(Angle)." The algorithm "findDistanceWhereSpacingWorksForDegrees(Angle)" is illustrated in FIG. 8. For a given angle in well spacing distance, there is a radius that can be used as the landing points for a sequence of wells that will be both the spacing distance apart at the landing point and that angular distance apart around the circle. Thus, a value for the distance (radius) is computed as a result of step 708.

In step 710, Azimuth is initialized to equal Angle. If Azimuth is less than 360+Angle, then increase the Azimuth by AngleIncr and go to step 706 where the method 700 repeats at step 708 until the conditions in step 706 are no longer met. If Azimuth is not less than 360+Angle, then go to step 712. This is a simple loop that increments Azimuth from its starting position (Angle) by AngleIncr until it becomes greater than or equal to Angle+360.

In step 712, the method 700 determines if Azimuth was previously used. If Azimuth was previously used, then go to step 710. If Azimuth was not previously used, then go to step 714. In this manner, the Azimuth is checked against the table of previous azimuths to keep from using the same azimuth multiple times.

In step 714, Azimuth is added to the table of previous azimuths.

Figure 9:
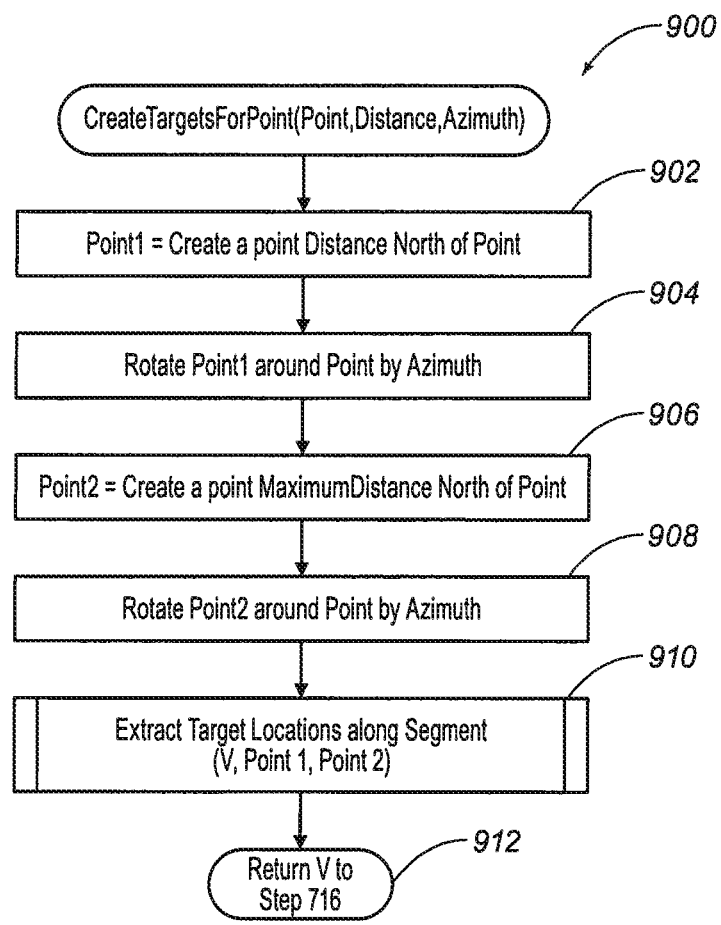
FIG. 9 is a flowchart illustrating one embodiment of the algorithm for step 716 in FIG. 7.

In step 716, V1 is set equal to "createTargetsForPoint (CenterLocation,Distance, Azimuth+AzimuthOffset)." The algorithm "createTargetsForPoint(CenterLocation, Distance,Azimuth+AzimuthOffset)" is illustrated in FIG. 9. This algorithm is called for each azimuth around the circle (incrementing by Angle) that has not been used.

In step 718, V1 is added to V and AngleIncr is set equal to Angle. In this manner, the method 700 is repeated until Angle is less than or equal to one in step 706.

In step 720, the method 700 returns V to step 108 in FIG. 1.

Referring now to FIG. 8, one embodiment of the "FindDistanceWhereSpacing WorksForDegrees(Angle)" algorithm for step 708 in FIG. 7 is illustrated.

In step 802, the method 800 determines if Angle is less than 70 degrees. If Angle is less than 70 degrees, then go to step 804. If Angle is not less than 70 degrees, then go to step 806. The method 800 therefore, effectively chooses between two trigonometric calculations (step 804 or step 806) depending upon whether the angle requested is greater than 70 degrees.

In step 804, the method 800 returns WellSpacing/Sine (Angle) to step 708 in FIG. 7. Step 804 therefore, returns a standard computation for a radius, given the angle and chord length of an arc, using well spacing as the chord length.

In step 806, the method 800 returns WellSpacing/(2*Sine (Angle/2)) to step 708 in FIG. 7. Step 806 therefore, is used to compute a radius for angles less than 70 degrees.

Referring now to FIG. 9, one embodiment of the "CreateTargetsForPoint(Point, Distance,Azimuth)" algorithm for step 716 in FIG. 7 is illustrated. The method 900 creates two points extending from an initial point at a predetermined azimuth and then calls an algorithm in step 910 with those two points to get the actual sets of heal/toe locations. The two points are created at the initial radius and the maximum radius. This is done by creating points at those distances due North of the CenterLocation and rotating them.

In step 902, create a point Distance North of Point and set equal to Point1.

In step 904, Point1 is rotated around Point by Azimuth.

In step 906, create a point MaximumDistance North of Point and set equal to Point2.

In step 908, Point2 is rotated around Point by Azimuth.

Figure 16:
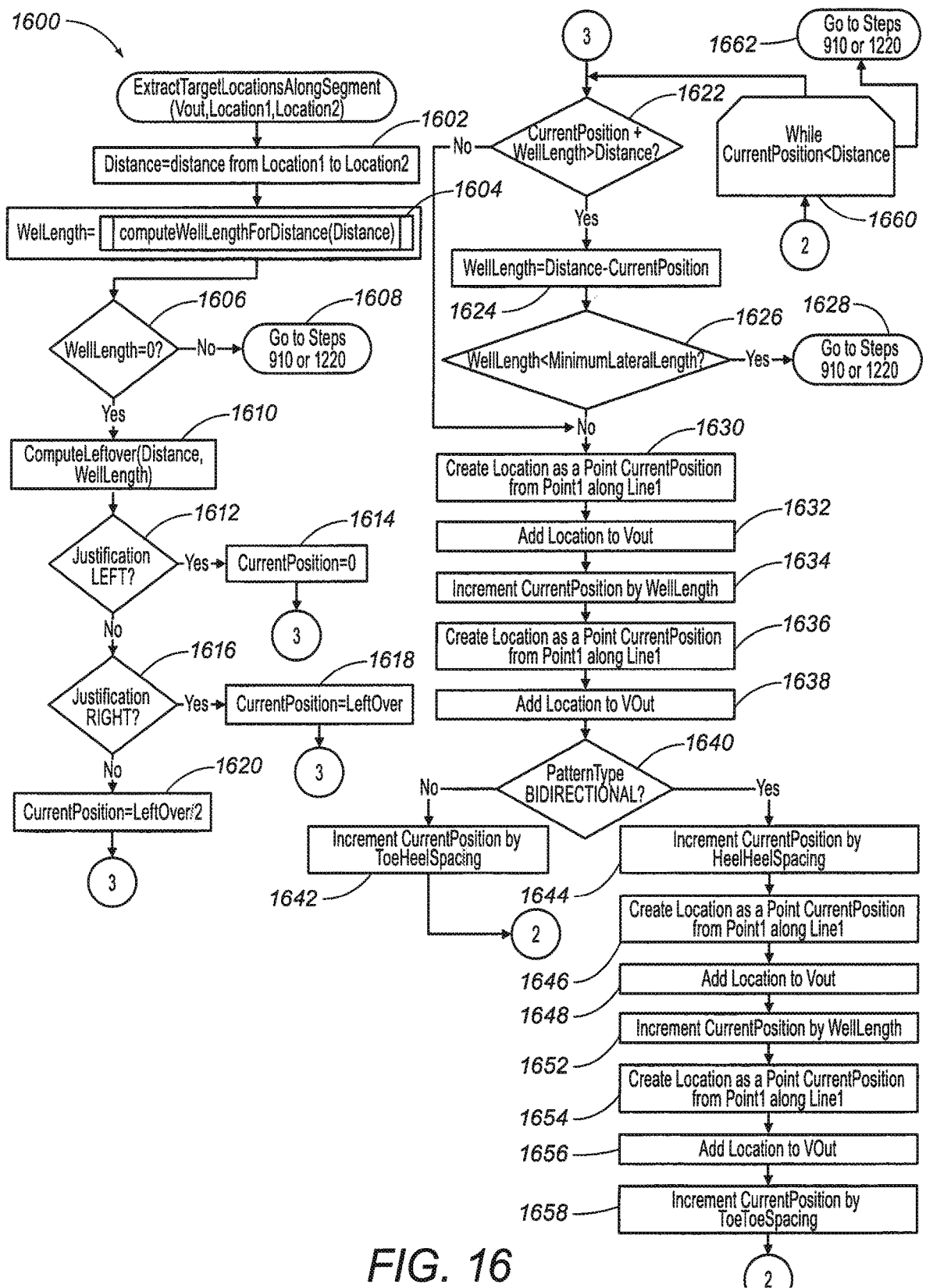
FIG. 16 is a flowchart illustrating one embodiment of the algorithm for step 910 in FIG. 9 and step 1220 in FIG. 12.

In step 910, the "extract Target Locations along Segment (V, Point 1, Point 2)" algorithm is executed. The algorithm "extract Target Locations along Segment (V, Point 1, Point 2)" is illustrated in FIG. 16. Optionally, other techniques well known in the art for creating two points at an initial radius and a maximum radius may be used.

In step 912, the method 900 returns V to step 716 in FIG. 7.

Creating Targets for Horizontal Laterals in Bidirectional and Unidirectional Patterns Referring now to FIG. 10, one embodiment of the "FindTargetLocations (Reference Well)" algorithm for step 114 in FIG. 1 is illustrated. The method 1000 uses a reference well to determine the azimuth and offset to be used in the "FindTarget Locations(Offset,Azimuth)" algorithm called in step 1024. Initially the method 1000 extracts a point and azimuth at the end (total depth or TD) of the reference well. The method 1000 then projects a line (Line1) running through the center location of the project area, perpendicular to the azimuth at another point (Point1) that is a maximum distance along that line from the center location. Point1 is the same point that is used for measurements in step 1024. The method 1000 then projects another line (Line2) running along the azimuth from the point that was extracted from the reference well. The intersection of Line1 and Line2 is Point 0. The distance between Point0 and Point1 is the offset distance from the original point. In order to get the proper offset distance to pass into step 1024, however, a predetermined well spacing distance must be subtracted from the offset distance until the offset distance is less than the well spacing distance.

In step 1002, Point is set equal to Point at TD of ReferenceWell.

In step 1004, Azimuth is set equal to Azimuth at TD of ReferenceWell.

At step 1006, Line1 is created as a line running horizontally through the center location (CenterLocation) of the project area.

In step 1008, Line1 is rotated by Azimuth.

In step 1010, Point1 is created as a Point MaxDistance along Line1 from Center Location.

In step 1012, Line2 is created as a line running vertically through Point.

In step 1014, Line2 is rotated by Azimuth.

In step 1016, Point0 is set equal to the intersection of Line1 and Line2.

In step 1018, Offset is set equal to Distance between Point0 and Point1.

In step 1020, the method 1000 determines if Offset is greater than Wellspacing. If Offset if greater than Wellspacing, then go to step 1022. If Offset is not greater than Wellspacing, then go to step 1024.

In step 1022, Offset is set equal to Offset−WellSpacing and returns to step 1020.

Figure 11:
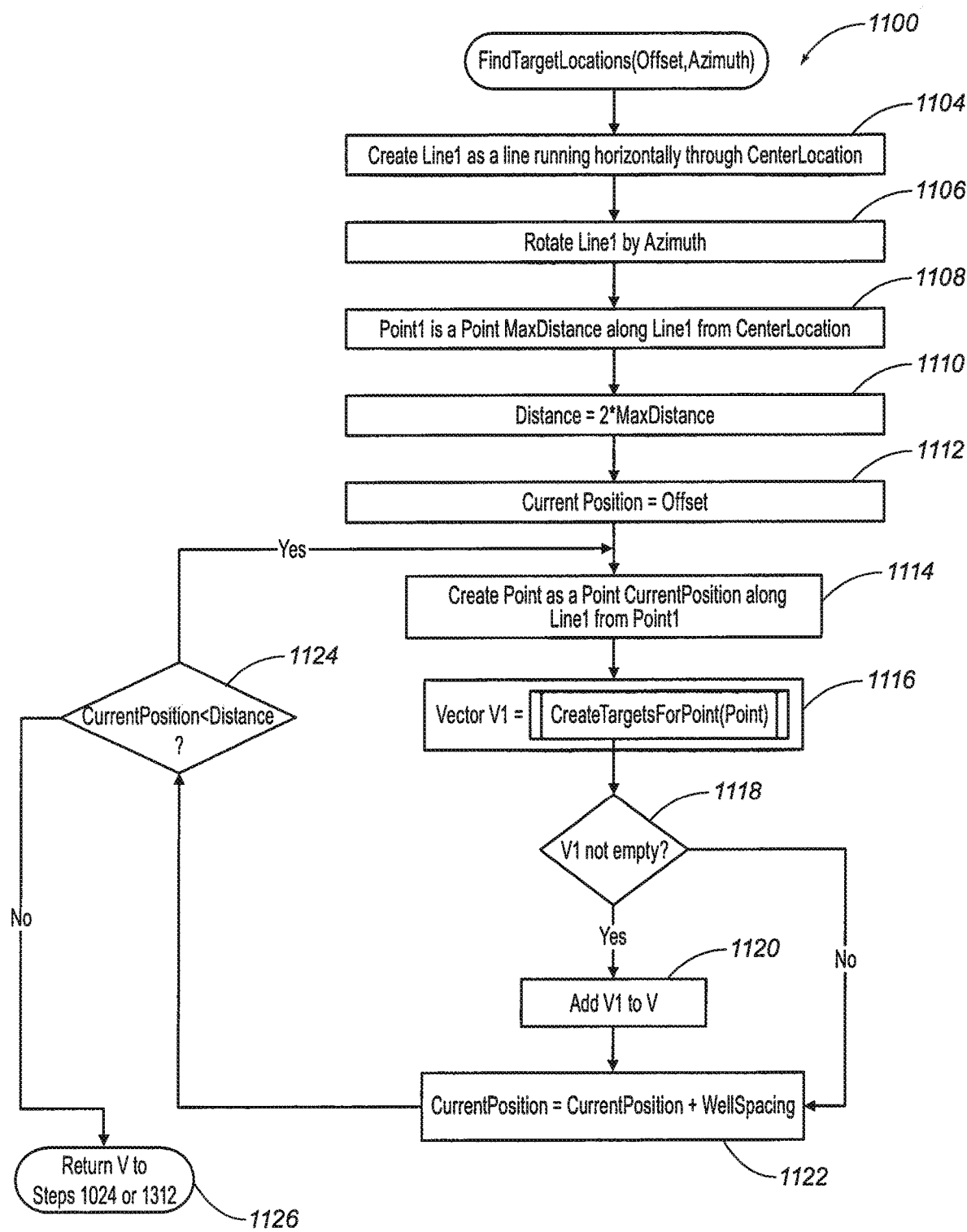
FIG. 11 is a flowchart illustrating one embodiment of the algorithm for step 1024 in FIG. 10 and step 1312 in FIG. 13.

In step 1024, V is set equal to "FindTargetLocations (Offset,Azimuth)." The algorithm "FindTargetLocations (Offset,Azimuth)" is illustrated in FIG. 11.

In step 1026, the method 1000 returns V to step 114 in FIG. 1.

Referring now to FIG. 11, one embodiment of the "FindTargetLocations(Off-set,Azimuth)" algorithm for step 1024 in FIG. 10 and step 1312 in FIG. 13 is illustrated. The method 1100 generally projects a line (Line1) running perpendicular to the azimuth through the center location of the project area. The method 1100 starts at a point (Point1) that is the computed maximum distance along the projected perpendicular line from the center location. The method 1100 further places a point every well spacing distance along that line until it reaches the computed maximum distance on the other side of the center location. At each of these points, the "CreateTargetsForPoint(Point)" algorithm in step 1116 is called to get a list of heel/toe pairs that were computed along the azimuth at that point. If that list is not empty, the method 1100 adds it to the overall list (V), which is returned in step 1126.

In step 1104, Line1 is created as a line running horizontally through Center Location.

In step 1106, Line1 is rotated by Azimuth.

In step 1108, Point1 is created as a Point MaxDistance along Line1 from Center Location.

In step 1110, Distance is set equal to 2*MaxDistance.

In step 1112, Current Position is set equal to Offset.

In step 1114, Point is created as Point CurrentPosition along Line1 from Point1.

Figure 12:
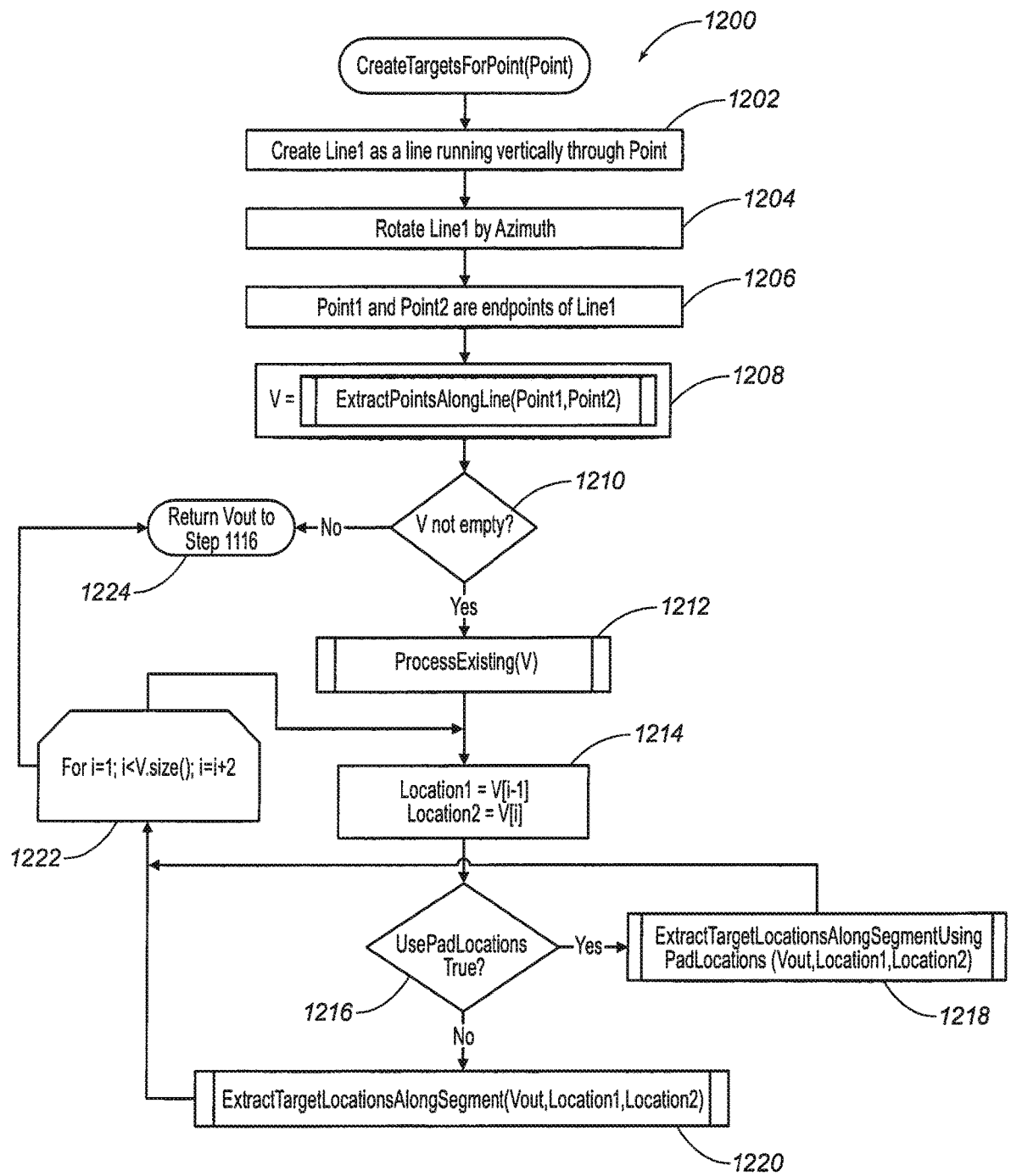
FIG. 12 is a flowchart illustrating one embodiment of the algorithm for step 1116 in FIG. 11.

In step 1116, Vector V1 is set equal to "CreateTargetsForPoint(Point)." The algorithm "CreateTargetsForPoint (Point)" is illustrated in FIG. 12.

In step 1118, the method 1100 determines if V1 is not empty. If V1 is not empty, then go to step 1120. If V1 is empty, then go to step 1122.

In step 1120, V1 is added to V.

In step 1122, CurrentPosition is set equal to CurrentPosition+WellSpacing.

In step 1124, the method 1100 determines if CurrentPosition is less than Distance. If CurrentPosition is less than Distance, then go step 1114, where the method 1100 is repeated. If CurrentPosition is not less than Distance, then go to step 1126.

In step 1126, V is returned to step 1024 in FIG. 10 or 1312 in FIG. 13.

Referring now to FIG. 12, one embodiment of the "CreateTargetsForPoint (Point)" algorithm for step 1116 in FIG. 11 is illustrated. The method 1200 generally creates a line through point at azimuth orientation. Points are extracted where this line intersects the boundary of the area that will be filled using the algorithm in step 1208. If there are any points extracted, then the extracted points may be modified by adding any points where they come within WellDistance of existing plans (if desired). For any remaining points, one of two algorithms for extracting the actual target locations in steps 1218 or 1220 from those sets of points may be used. If, for example, matching existing pad locations is desired, then the algorithm in step 1218 may be used. Otherwise, the algorithm in step 1220 may be used to derive an optimal set of target locations.

In step 1202, Line1 is created as a line running vertically through Point.

In step 1204, Line1 is rotated by Azimuth.

In step 1206, Point1 and Point2 are set as endpoints of Line1.

Figure 15:
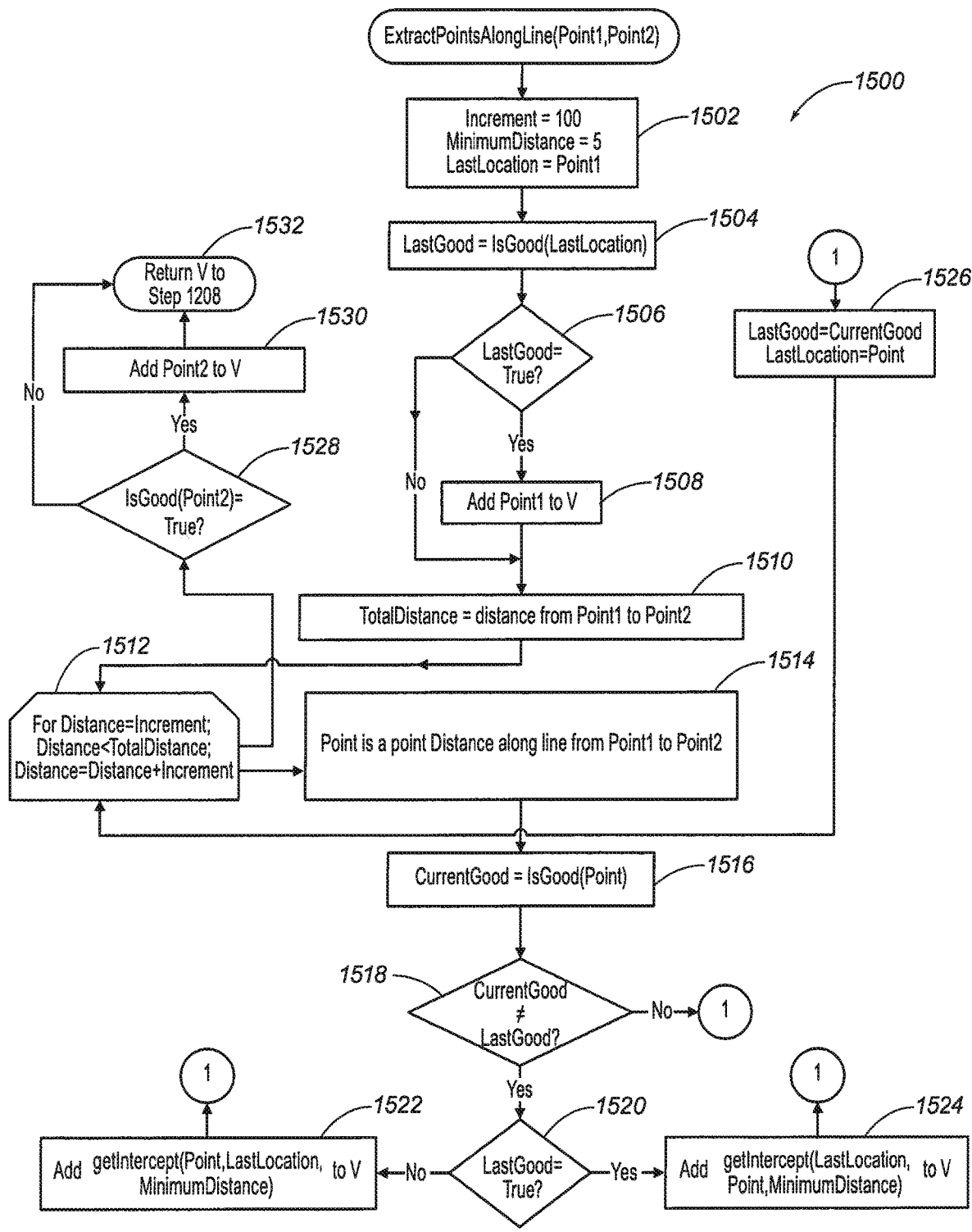
FIG. 15 is a flowchart illustrating one embodiment of the algorithm for step 1208 in FIG. 12.

In step 1208, V is set equal to "ExtractPointsAlongLine(Point1,Point2)." The algorithm "ExtractPointsAlongLine(Point1,Point2)" is illustrated in FIG. 15.

In step 1210, the method 1200 determines if V is not empty. If V is not empty, then go to step 1212. If V is empty, then go to step 1224.

Figure 14:
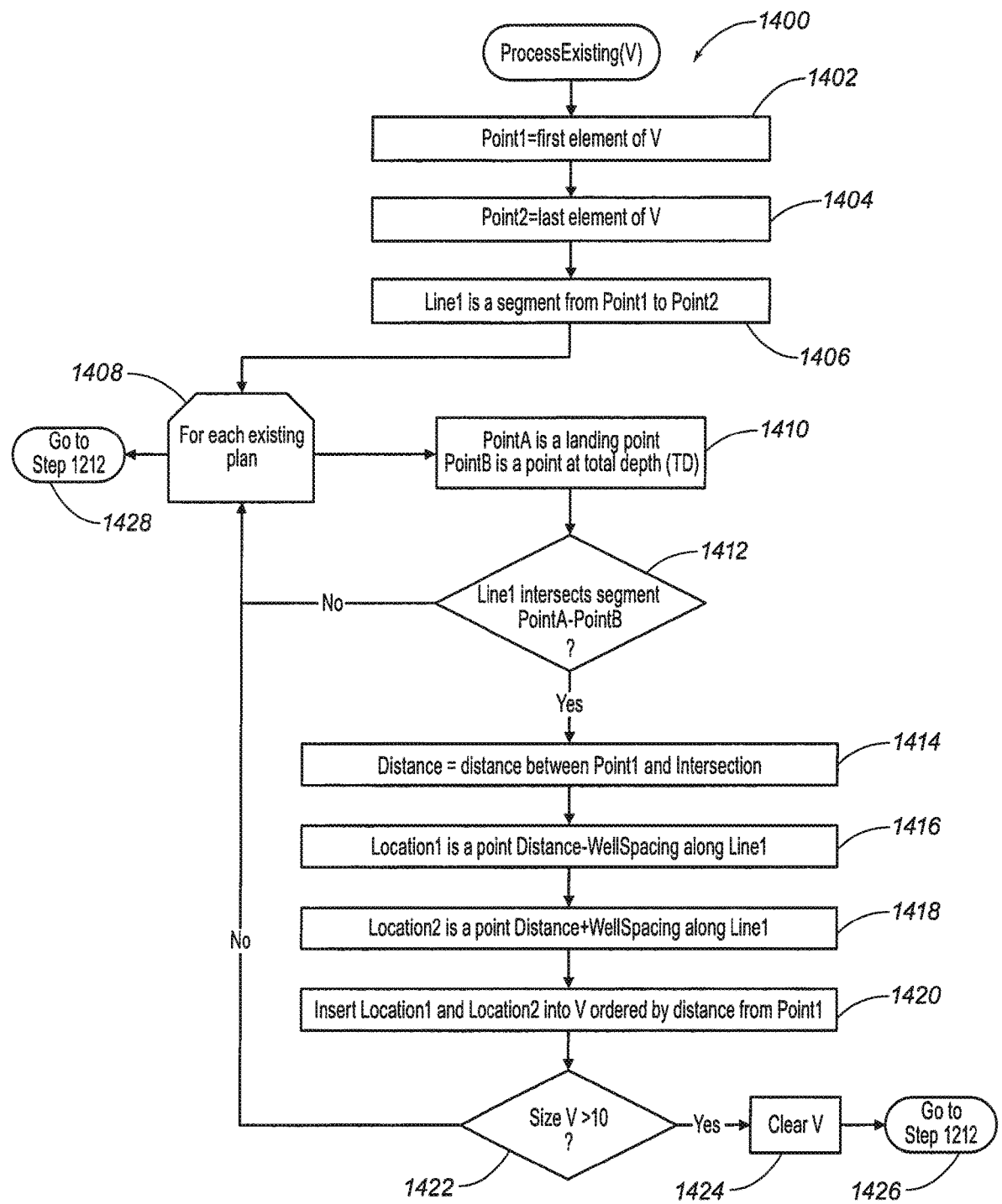
FIG. 14 is a flowchart illustrating one embodiment of the algorithm for step 1212 in FIG. 12.

In step 1212, the "ProcessExisting(V)" algorithm is executed. One embodiment of the "ProcessExisting(V)" algorithm is illustrated in FIG. 14.

In step 1214, Location1 is set equal to V[i−1] and Location2 is set equal to V[i].

In step 1216, the method 1200 determines if UsePadLocations is true. If Use PadLocations is true, then go to step 1218. If UsePadLocations is not true, then go to step 1220.

Figure 17A:
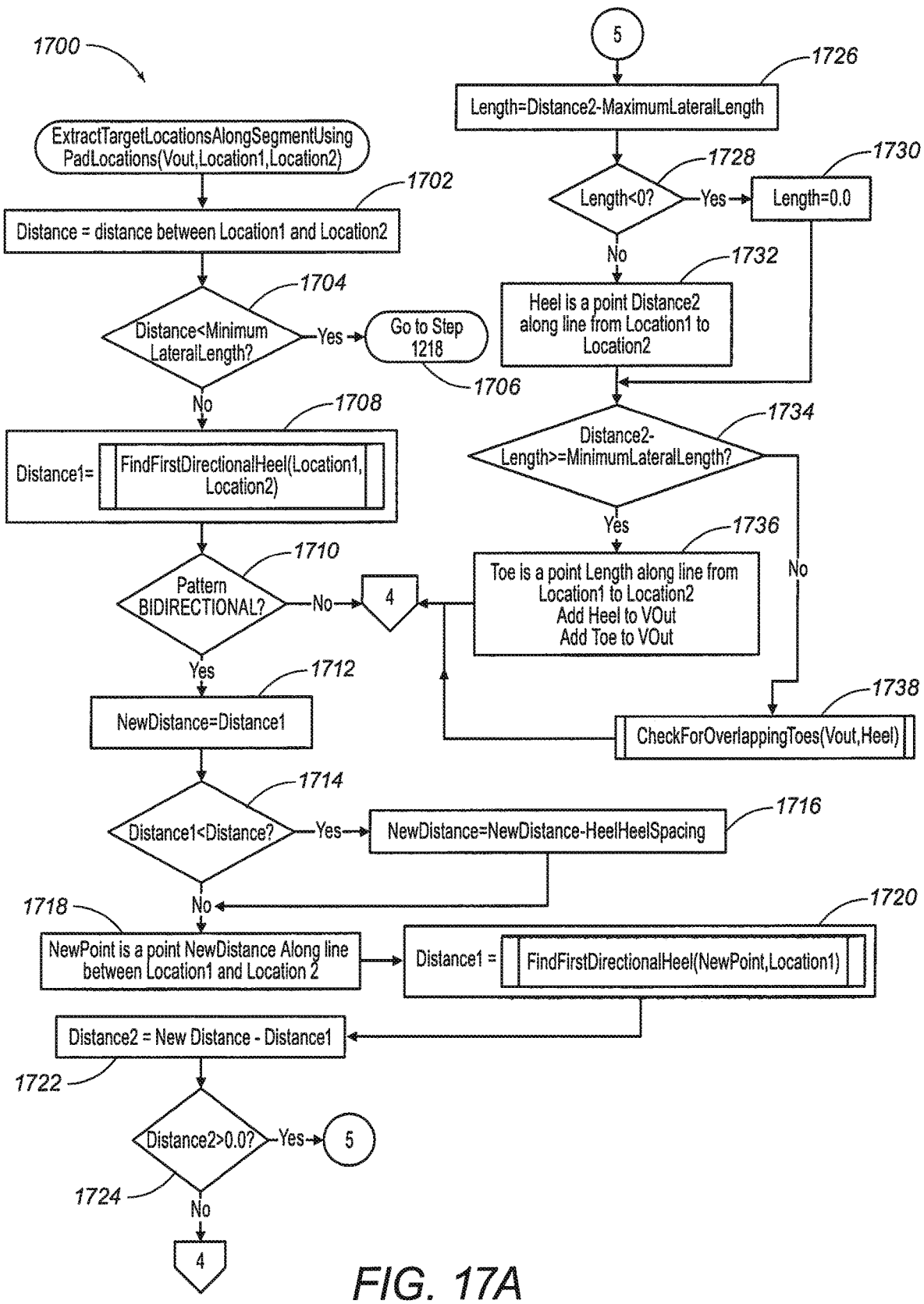
FIG. 17A is a flowchart illustrating one embodiment of the algorithm for step 1218 in FIG. 12.
Figure 17B:
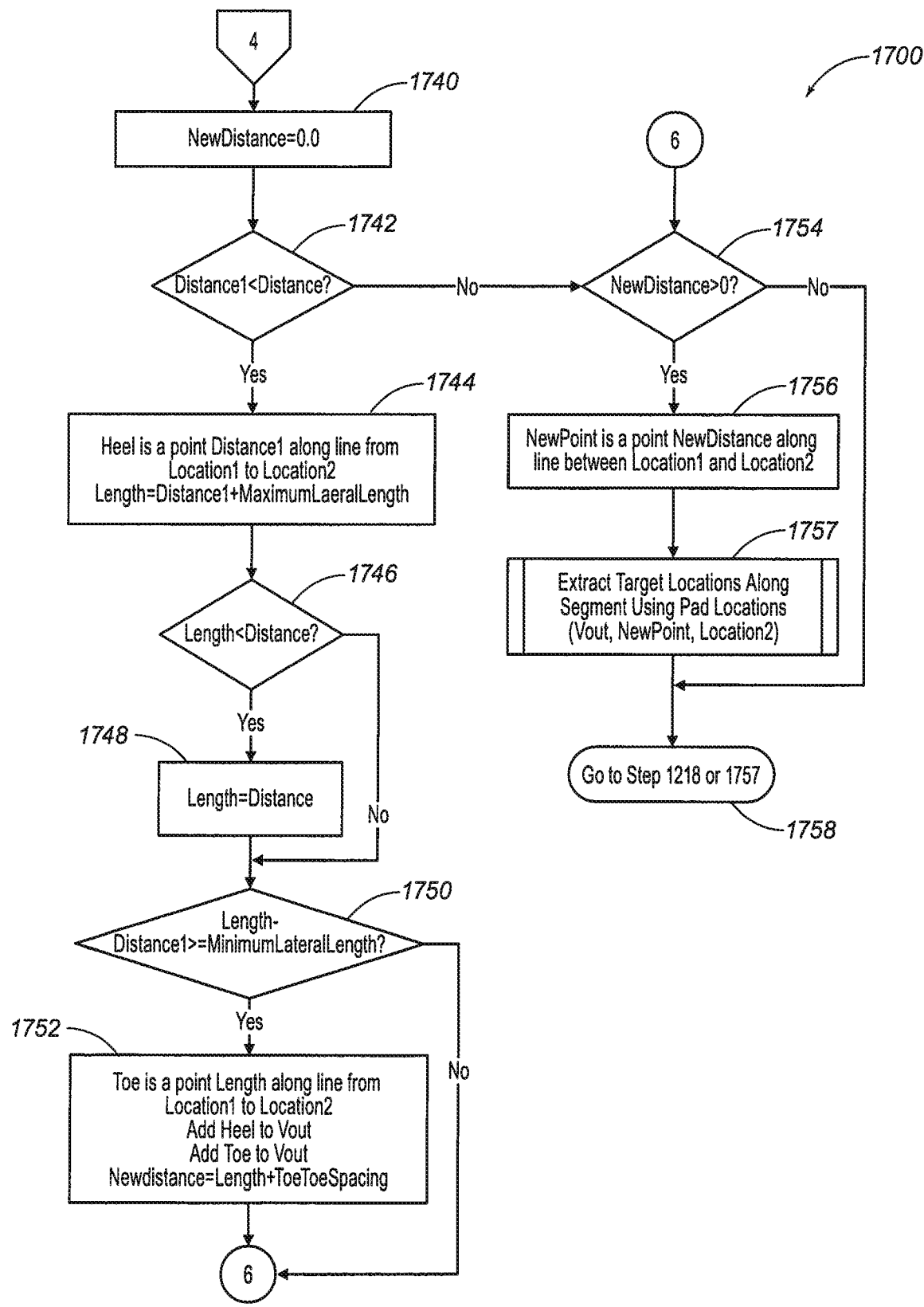
FIG. 17B is a continuation of the flowchart illustrated in FIG. 17A.

In step 1218, the "ExtractTargetLocationsAlongSegmentUsingPadLocations (Vout,Location1,Location2)" is executed. One embodiment of the "ExtractTarget LocationsAlongSegmentUsingPadLocations(Vout,Location1,Location2)" algorithm is illustrated in FIGS. 17A and 17B.

In step 1220, the "ExtractTargetLocationsAlongSegment (Vout,Location1,Location2)" algorithm is executed. One embodiment of the "ExtractTargetLocationsAlong Segment (Vout,Location1,Location2)" algorithm is illustrated in FIG. 16.

In step 1222, variable i is initialized to equal 1. If i is less than V.size( ), then increase i by 2 and go to step 1214 where the method 1200 is repeated. If i is not less than V.size( ), then go to step 1224.

In step 1224, the method 1200 returns Vout to step 1116 in FIG. 11. Vout is a collection of target locations.

Referring now to FIG. 13, one embodiment of the "FindOptimalTargetLocations( )" algorithm for step 116 in FIG. 1 is illustrated. The method 1300 calls the "Find TargetLocations(Offset)" algorithm in a loop using various offset values to find the best offset. The method 1300 also can do this for a range of azimuths, if necessary. In most cases, however, the azimuth is preferably fixed so that the "FindTargetLocations(Offset)" algorithm in step 1312 is only executed once. The set of target locations found within each iteration of the inner loop (steps 1310 through 1318) is evaluated based upon a simple accumulation of the distances between the heel and toe of each target location pair within that set. If that length is found to be larger than the previous MaximumLength, the MaximumLength is updated and the set of target locations is stored so that when all iterations have been run, the best set of target pair locations (VMax) can be returned to step 116 in FIG. 1.

In step 1302, Increment is set equal to WellSpacing/20.

In step 1304, MaximumLength is set equal to zero.

In step 1306, AzimuthIncrement is set equal to Maximum (1(MaxAzimuth−Min Azimuth)/10).

In step 1308, Azimuth is initialized to equal MinAzimuth. If Azimuth is less than or equal to MaxAzimuth, then increase Azimuth by AzimuthIncrement and go to step 1310. If Azimuth is not less than or equal to MaxAzimuth, then go to step 1320.

In step 1310, Offset is initialized to equal zero. If Offset is less than Well Spacing, then increase Offset by Increment and go to 1312. If Offset is not less than WellSpacing, then go to step 1308.

In step 1312, V is set equal to "FindTargetLocations (Offset,Azimuth)." The algorithm "FindTargetLocations (Offset,Azimuth)" is illustrated in FIG. 11.

In step 1314, Length is set equal to "evaluateTargetLocations(V)," which effectively runs a total for the lengths of every heel/toe pair to get a total footage for this set of target locations. Optionally, this algorithm could be run to obtain a total number of pairs or a largest average length.

In step 1316, the method 1300 determines if Length is greater than Maximum Length. If Length is greater than MaximumLength, then go to step 1318. If Length is not greater than MaximumLength, then go to step 1310, where the method 1300 repeats at step 1312 until the conditions in step 1310 are no longer met.

In step 1318, MaximumLength is set equal to Length and Vmax is set equal to V.

In step 1320, the method 1300 returns VMax to step 116 in FIG. 1.

Referring now to FIG. 14, one embodiment of the "ProcessExisting(V)" algorithm for step 1212 in FIG. 12 is illustrated. The method 1400 searches for point where the line from the first point in V to the last point in V crosses an existing plan. When such a point is found, two points are inserted into the collection, one WellSpacing before the intersection point and one WellSpacing after the intersection point. If the collection of points becomes larger than ten, then there are too many crossings and V is cleared before returning to step 1212 in FIG. 12.

In step 1402, Point1 is set equal to the first element of V.

In step 1404, Point2 is set equal to the last element of V.

In step 1406, Line1 is created as a segment from Point1 to Point2.

In step 1408, a loop is started for each existing plan beginning with step 1410 through step 1422. Once V is greater than ten or there are no more plans, the loop exits and the method 1400 returns to step 1212 in FIG. 12.

In step 1410, PointA is created as a landing point and PointB is created as a point at total depth (TD).

In step 1412, the method 1400 determines if Line1 intersects segment PointA-PointB. If Line1 intersects segment PointA-PointB, then go to step 1414. If Line1 does not intersect segment PointA-PointB, then go to step 1408 where the method 1400 is repeated for another existing plan or returns to step 1212 if there are no more plans.

In step 1414, Distance is set equal to the distance between Point1 and Intersection, which is the intersection of Line1 and segment PointA-PointB.

In step 1416, Location1 is created as a point Distance−WellSpacing along Line1.

In step 1418, Location2 is created as point Distance+WellSpacing along Line1.

In step 1420, Location1 and Location2 are inserted into V, which is ordered by distance from Point1.

In step 1422, the method 1400 determines if the Size of V is greater than 10. If the Size of V is greater than 10, then go to step 1424. If the Size of V is not greater than 10, then go to step 1408 as the method 1400 is repeated for another existing plan or returns to step 1212 if there are no more plans.

In step 1424, V is cleared.

In step 1426, the method 1400 returns to step 1212.

In step 1428, the method 1400 returns to step 1212.

Referring now to FIG. 15, one embodiment of the "ExtractPointsAlongLine (Point1,Point2)" algorithm in FIG. 12 is illustrated. The method 1500 generally takes two points and uses the algorithm (IsGood) in step 1504 and step 1516 to determine whether a particular point is in an acceptable area for targeting and to derive a set of intersection points such that the area between the first and second point will be in the acceptable area, the area between the second and third point will be out of the acceptable area, and so on. If there are no points along the line between Point1 and Point 2 that are in the acceptable area, then the set (V) that is returned in step 1532 will be empty.

In step 1502, Increment is set equal to 100, MinimumDistance is set equal to 5 and LastLocation is set equal to Point1.

In step 1504, LastGood is set equal to IsGood(LastLocation). In this manner, the previous point tested can be tracked to determine whether it was in the acceptable area for targeting or out of the acceptable area for targeting. IsGood (LastLocation) therefore, may be any means well known in the art for deciding whether a particular x,y location (point) is a valid location for horizontal drilling and may include, for example, using boundaries and/or grids.

In step 1506, the method 1500 determines whether LastGood is true. If Last Good is true, then go to step 1508. If LastGood is not true, then go to step 1510.

In step 1508, Point1 is added to V. If the initial point is good, then LastGood is true and the initial point will be added to the set (V).

In step 1510, TotalDistance is set equal to distance from Point1 to Point2.

In step 1512, Distance is initialized to equal Increment. If Distance is less than TotalDistance, then increase Distance by Increment and go to step 1528. If Distance is not less than TotalDistance, then go to step 1514.

In step 1514, Point is created as a point distance along a line from Point1 to Point2.

In step 1516, CurrentGood is set equal to IsGood(Point).

In step 1518, the method 1500 determines if CurrentGood does not equal Last Good. If CurrentGood does not equal LastGood, then go step 1520. If CurrentGood equals LastGood, then go to step 1526. In this manner, the method 1500 searches for the boundary points where a point on one side will be good and a point on the other side will be bad.

In step 1520, the method 1500 determines if LastGood is true. If LastGood is true, then go to step 1524. If LastGood is not true, then go to step 1522. In this manner, the method 1500 searches for the boundary points where a point on one side will be good and a point on the other side will be bad. Since the method 1500 for searching the boundary works based upon an ordered set of a good point and a bad point, it is ordered one way when going from good to bad according to step 1524, and it is ordered another way when going from bad to good according to step 1522.

In step 1522, getIntercept(Point,LastLocation,MinimumDistance) is added to V. The getIntercept(Point,LastLocation,MinimumDistance) algorithm may employ techniques well known in the art for finding the point along a line where the acceptance criteria goes from good to bad within a specified minimum distance.

In step 1524, getIntercept(LastLocation,Point,MinimumDistance) is added to V. The getIntercept(Point,LastLocation,MinimumDistance) algorithm may employ techniques well known in the art for finding the point along a line where the acceptance criteria goes from good to bad within a specified minimum distance.

In step 1526, LastGood is set equal to CurrentGood and LastLocation is set equal to Point.

In step 1528, the method 1500 determines if IsGood (Point) is true. If IsGood (Point) is true, then go to step 1530. If IsGood(Point) is not true, then go to step 1532.

In step 1530, Point2 is added to V.

In step 1532, the method 1500 returns V to step 1208 in FIG. 12.

Referring now to FIG. 16, one embodiment of the "ExtractTargetLocations AlongSegment(Vout,Location1, Location2)" algorithm for step 910 in FIG. 9 and step 1220 in FIG. 12 is illustrated. The method 1600 generally takes some interval between two points and divides it into a set of equal length heel/toe pairs that follow certain spacing rules. The spacing values can be either a toeheel distance if the wells are to be laid out in a heel-toe (i.e., all facing the same direction) or a heelheel and a toetoe distance if the wells are to be laid out in a toe-heel heel-toe sequence. The latter sequence is typically used when a drilling pad is to be placed between the two heels, so the heelheel spacing is typically a fairly large value to allow for the wells to build to horizontal in both directions. In addition to the fixed spacing's and the computed well length that is somewhere between a predetermined minimum and maximum lateral length, there is often additional space remaining. This space will either be divided equally between the two ends or all placed at the beginning of the sequence or the end of the sequence depending upon the justification value determined in steps 16124620. The remaining space is addressed by setting the initial CurrentPosition in step 1620. If the pattern type is bidirectional (toe-heel heel-toe), each iteration will create up to four locations (for two laterals). Otherwise, each iteration will only create a maximum of two locations (one lateral).

In step 1602, Distance is set equal to distance from Location1 to Location2.

In step 1604, WellLength is set equal to "computeWellLengthForDistance (Distance)." The algorithm "computeWellLengthForDistance(Distance)" is illustrated in FIG. 5.

In step 1606, the method 1600 determines if WellLength equals zero. If Well Length equals zero, then go to step 1610. If WellLength does not equal zero, then go to step 1608.

In step 1608, the method 1600 returns to step 910 or step 1220.

In step 1610, an algorithm for ComputeLeftover(Distance,WellLength) is executed. Using techniques well known in the art, the leftover amount is computed by taking the total distance and successively subtracting the distance for the well length and either the HeelHeelSpacing, the ToeToeSpacing or the HeelToeSpacing as appropriate, until an amount that is greater than or equal to zero and less than the well length+the appropriate spacing is achieved.

In step 1612, the method 1600 determines if Justification is LEFT. If Justification is LEFT, then go to step 1614. If Justification is not LEFT, then go to step 1616.

In step 1614, CurrentPosition is set equal to zero.

In step 1616, the method 1600 determines if Justification is RIGHT. If Justification is RIGHT, then go to step 1618. If Justification is not RIGHT, then go to step 1620.

In step 1618, CurrentPosition is set equal to LeftOver.

In step 1620, CurrentPosition is set equal to LeftOver/2.

In step 1622, the method 1600 determines if CurrentPosition+WellLength is greater than Distance. If CurrentPosition+WellLength is greater than Distance, then go to step 1624, If CurrentPosition+WellLength is not greater than Distance, then go to step 1630.

In step 1624, WellLength is set equal to Distance−CurrentPosition.

In step 1626, the method 1600 determines if WellLength is less than Minimum LateralLength. If WellLength is less than MinimumLateralLength, then go to step 1628. If WellLength is not less than MinimumLateralLength, then go to step 1630.

In step 1628, the method 1600 returns to step 910 or step 1220.

In step 1630, Location is created as a Point CurrentPosition from Point1 along Line1.

In step 1632, Location is added to Vout.

In step 1634, CurrentPosition is incremented by WellLength.

In step 1636, Location is created as a Point CurrentPosition from Point1 along Line1.

In step 1638, Location is added to Vout.

In step 1640, the method 1600 determines if the PatternType is BIDIRECTIONAL. If the PatternType is BIDIRECTIONAL, then go to step 1644, If the Pattern Type is not BIDIRECTIONAL, then go to step 1642.

In step 1642, CurrentPosition is incremented by ToeHeelSpacing.

In step 1644, CurrentPosition is incremented by HeelHeelSpacing.

In step 1646, Location is created as a Point CurrentPosition from Point1 along Line1.

In step 1648, Location is added to Vout.

In step 1652, CurrentPosition is incremented by WellLength.

In step 1654, Location is created as a Point CurrentPosition from Point1 along Line1.

In step 1656, Location is added to Vout.

In step 1658, CurrentPosition is incremented by ToeToeSpacing.

In step 1660, the method 1600 is repeated in a loop while CurrentPosition is less than Distance and is repeated at step 1622. If CurrentPosition is not less than Distance, then the loop command in step 1660 proceeds to step 1662.

In step 1662, the method 1600 returns to step 910 or step 1220.

Referring now to FIG. 5, one embodiment of the "ComputeWellLengthFor Distance(Distance)" algorithm for step 1604 in FIG. 16 is illustrated. The method 500 generally checks to determine if the PatternType is BIDIRECTIONAL and then calls the "ComputeWellLengthForDistance" algorithm for either HeelHeelSpacing and ToeToe Spacing or just ToeHeelSpacing as the spacing parameters.

In step 502, the method 500 determines if the PatternType is BIDIRETIONAL. If the PatternType is BIDIRETIONAL, then go to step 504. If the PatternType is not BIDIRETIONAL, then go to step 508.

In step 504, the "ComputeWellLengthForDistance(Distance,MinimumLateral Length,MaximumLateralLength, HeelHeelSpacing,ToeToeSpacing)" algorithm is executed. One embodiment of this algorithm is illustrated in FIG. 6, which is described hereinabove.

In step 506, the method 500 returns WellLength to step 1604 in FIG. 16.

In step 508, the "ComputeWellLengthForDistance(Distance,MinimumLateral Length,MaximumLateralLength, ToeHeelSpacing,ToeHeelSpacing)" algorithm is executed. On embodiment of this algorithm is illustrated in FIG. 6, which is described hereinabove.

In step 510, the method 500 returns WellLength to step 1604 in FIG. 16.

Referring now to FIG. 17A and FIG. 17B, one embodiment of the "Extract TargetLocationsAlongSegmentUsingPadLocations(Vout,Location1,Location2)" algorithm for step 1218 in FIG. 12 is illustrated. The method 1700 addresses the need to honor specific pad locations when planning lateral wells. Rather than attempting to fit as many lateral wells as possible between the multiple pad locations, the method 1700 identifies points along the line between Location1 and Location2 that are both far enough from each end of that line to meet the minimum lateral length restrictions and close enough to one of the pad locations to be reached from that pad without being so close to the pad that there is no room to build a lateral well to 90 degrees.

In step 1702, Distance is set equal to distance between Location1 and Location2.

In step 1704, the method 1700 determines if Distance is less than Minimum LateralLength. If Distance is less than MinimumLateralLength, then go to step 1706. If Distance is not less than MinimumLateralLength, then go to step 1708. This step checks to make sure that the distance between the two points (Location1 and Location2) is at least as large as the MinimumLateralLength.

In step 1706, the method 1700 returns to step 1218.

Figure 18:
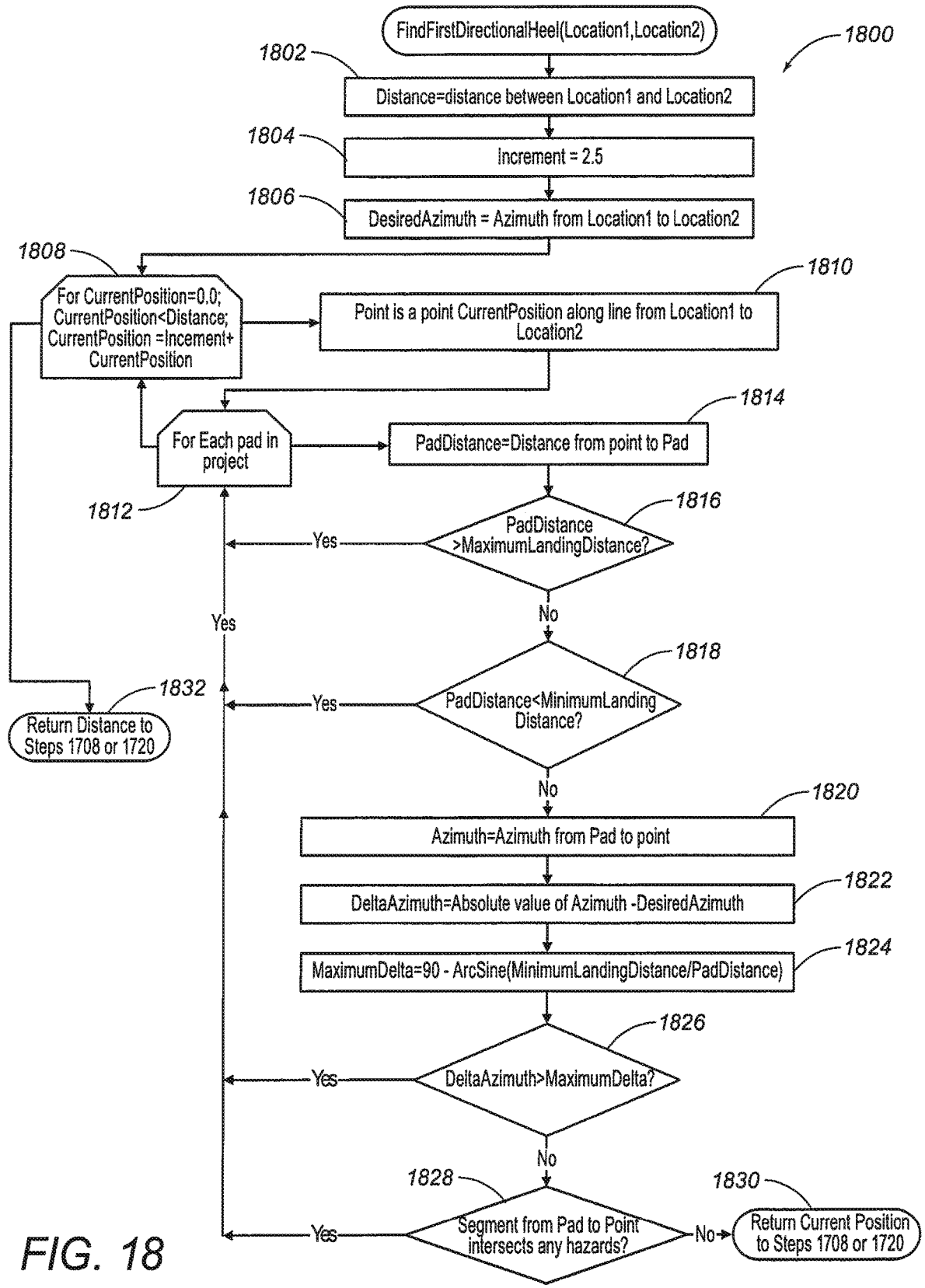
FIG. 18 is a flowchart illustrating one embodiment of the algorithm for steps 1708 and 1720 in FIG. 17.

In step 1708, Distance1 is set equal to "FindFirstDirectionalHeel(Location1, Location2)." The algorithm "FindFirstDirectionalHeel(Location1,Location2)" is illustrated in FIG. 18. This step locates the first directional heel distance along the line. This is the distance to the first location along the line that can serve as the landing point for a lateral well that is heading in the same direction as the line segment. This distance is represented by Distance1. Distance1 may equal Distance in step 1702 (i.e., the total distance between Location1 and Location2 if FindFirstDirectionalHeel was unsuccessful.

In step 1710, the method 1700 determines if the Pattern is BIDIRECTIONAL. If the Pattern is BIDIRECTIONAL, then go to step 1712. If the Pattern is not BIDIRECTIONAL, then go to step 1740 in FIG. 17B. Therefore, if the Pattern is BIDIRECTIONAL, the method 1700 will identify the point along the line prior to the Distance1 point at which it will start searching in the other direction for the opposite facing lateral well.

In step 1712, NewDistance is set equal to Distance1.

In step 1714, the method 1700 determines if Distance1 is less than Distance. If Distance1 is less than Distance, then go to step 1716. If Distance1 is not less than Distance, then go to step 1718.

In step 1716, NewDistance is set equal to NewDistance−HeelHeelSpacing.

In step 1718, NewPoint is created as a point NewDistance Along a line between Location1 and Location2. This point (NewPoint) is now used in the algorithm for step 1720 as the first point.

In step 1720, Distance1 is set equal to "FindFirstDirectionalHeel(NewPoint, Location1)," The algorithm "FindFirstDirectionalHeel(NewPoint,Location1)" is illustrated in FIG. 18.

In step 1722, Distance2 is set equal to New Distance−Distance1. Distance2 therefore, is the distance from Point1 to the first possible landing point along the segment from NewPoint to Point1.

In step 1724, the method 1700 determines if Distance2 is greater than zero. If Distance2 is greater than zero, then go to step 1726. If Distance2 is not greater than zero, then go to step 1740 in FIG. 17B. Therefore, if Distance2 is zero, no landing point was found.

In step 1726, Length is set equal to Distance2−MaximumLateralLength.

In step 1728, the method 1700 determines if the Length is less than zero. If Length is less than zero, then go to step 1730, If Length is not less than zero, then go to step 1732.

In step 1730, Length is set equal to zero.

In step 1732, Heel is created as a point Distance2 along a line between Location 1 and Location2.

In step 1734, the method 1700 determines if Distance2−Length is greater than or equal to MinimumLateralLength. If Distance2−Length is greater than or equal to MinimumLateralLength, then go to step 1736. If Distance2−Length is not greater than or equal to MinimumLateralLength, then go to step 1738.

In step 1736, Toe is created as a point Length along a line between Location1 and Location2 and Heel and Toe are each added to Vout.

Figure 19:
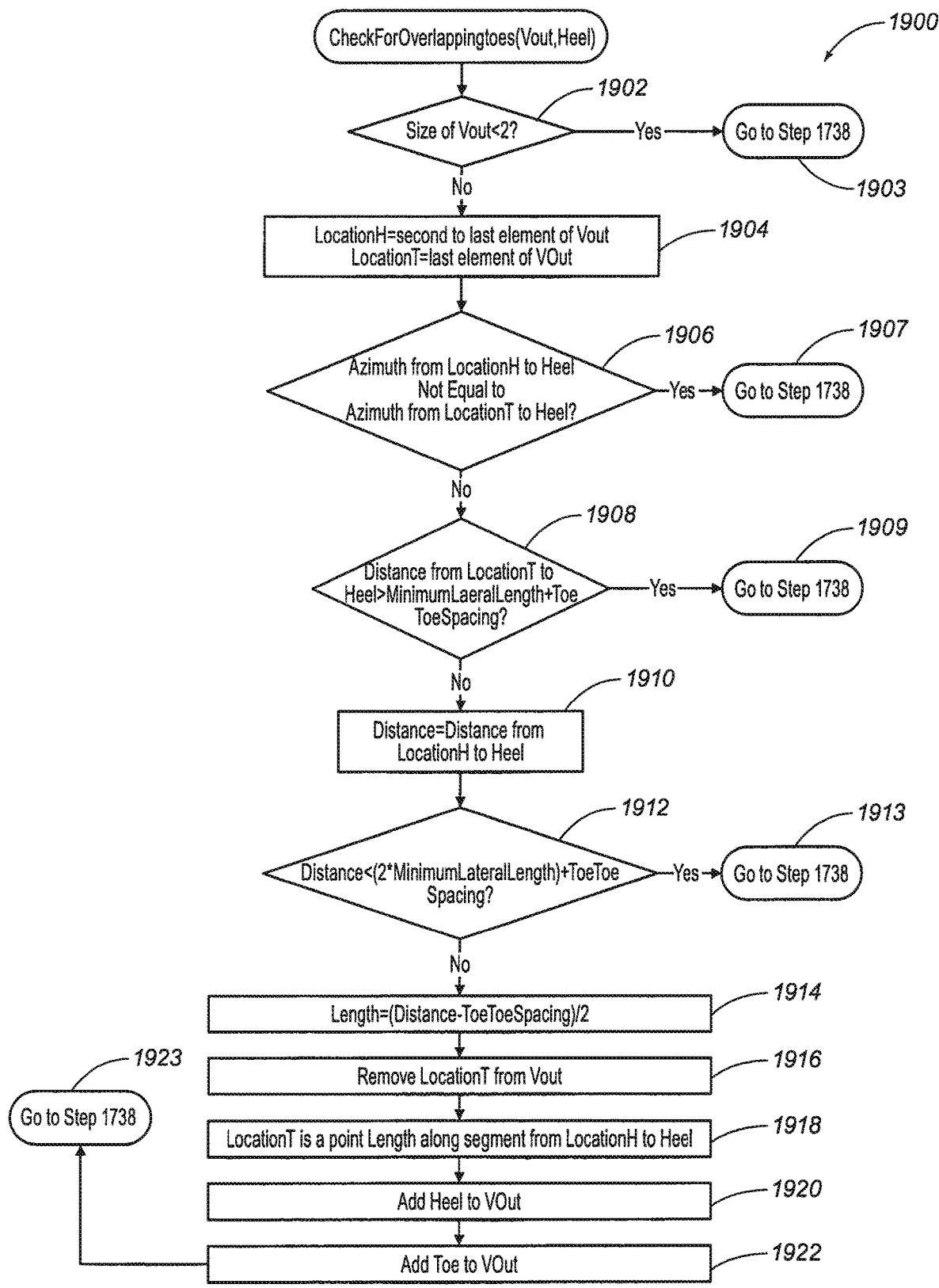
FIG. 19 is a flowchart illustrating one embodiment of the algorithm for step 1738 in FIG. 17.

In step 1738, the "CheckForOverlappingToes(Vout,Heel)" algorithm is executed. This algorithm is executed to determine if there is still a way to plan a lateral well. One embodiment of this algorithm is illustrated in FIG. 19.

In step 1740, NewDistance is set equal to zero.

In step 1742, the method 1700 determines if Distance1 is less than Distance. If Distance1 is less than Distance, then go to step 1744. If Distance1 is not less than Distance, then go to step 1754.

In step 1744, Heel is created as a point Distance1 along a line between Location 1 and Location2 and Length is set equal to Distance1+MaximumLateralLength.

In step 1746, the method 1700 determines if the Length is less than Distance. If Length is less than Distance, then go to step 1748. If Length is not less than Distance, then go to step 1750.

In step 1748, Length is set equal to Distance.

In step 1750, the method 1700 determines if Length−Distance1 is greater than or equal to MinimumLateralLength. If Length−Distance1 is greater than or equal to MinimumLateralLength, then go to step 1752. If Length−Distance1 is not greater than or equal to MinimumLateralLength, then go to step 1754.

In step 1752, Toe is created as a point Length along a line between Location1 and Location2, Heel and Toe are each added to Vout, and NewDistance is set equal to Length+ToeToeSpacing.

In step 1754, the method 1700 determines if NewDistance is greater than zero. If NewDistance is greater than zero, then go to step 1756. If NewDistance is not greater than zero, then go to step 1758.

In step 1756, NewPoint is created as a point NewDistance along a line between Location1 and Location2.

In step 1757, the "ExtractTargetLocationsAlongSegmentUsingPadLocations (Vout,NewPoint,Location2)" algorithm is executed. Basically, the method 1700 is called recursively for (Vout,NewPoint,Location2).

In step 1758, the method 1700 returns to step 1218 or step 1757.

Referring now to FIG. 18, one embodiment of the "FindFirstDirectionalHeel (Location1,Location2)" algorithm for step 1708 and step 1720 in FIG. 17 is illustrated. The method 1800 generally looks for the first point along the line segment that could be used as a heel or landing point, based upon a set of known pad locations. Method 1800 incrementally traverses the line segment.

In step 1802, Distance is set equal to distance between Location1 and Location2.

In step 1804, Increment is set equal to 2.5. Other increments may be used, however, depending upon the desired accuracy and performance efficiency.

In step 1806, DesiredAzimuth is set equal to Azimuth from Location1 to Location2.

In step 1808, CurrentPosition is initialized to equal zero. If CurrentPosition is less than Distance, then increase CurrentPosition by Increment and go to step 1810. If CurrentPosition is not less than Distance, then go to step 1832.

In step 1810, Point is created as a point CurrentPosition along a line between Location1 and Location2.

In step 1812, a loop is started for each pad in a predefined project beginning with step 1814 through step 1828. Each pad is checked against the Point created in step 1810 and after all of the pads in the project are checked against that Point, the control loops back to step 1808 to define another Point and check each pad against that Point.

In step 1814, PadDistance is set equal to Distance from point to Pad.

In step 1816, the method 1800 determines if PadDistance is greater than MaximumLandingDistance. If PadDistance is greater than MaximumLandingDistance, then go to step 1812. If PadDistance is not greater than MaximumLandingDistance, then go to step 1818. MaximumLandingDistance is defined as the number of slots in the pad divided by two (for each direction sideways) and dividing by two again if there are stacked lateral wells, and dividing by two again if the pattern is bidirectional. The result is multiplied by WellSpacing. Therefore, a pad with eight slots that is bidirectional, but not stacked, will have a maximum landing distance of 2*WellSpacing so it can extend out far enough to pick up two lateral wells in each direction on each side for a total of eight, which matches the number of slots.

In step 1818, the method 1800 determines if PadDistance is less than Minimum LandingDistance. If PadDistance is less than MinimumLandingDistance, then go to step 1812. If PadDistance is not less than MinimumLandingDistance, then go to step 1820. MinimumLandingDistance is the distance that it takes for the well to build to a vertical position. MinimumLandingDistance therefore, may be designed as one-half of the Heel HeelSpacing since the HeelHeelSpacing is intended to be the distance that it takes two wells building in opposite directions to reach 90 degrees.

In step 1820, Azimuth is set equal to Azimuth from Pad to point.

In step 1822, DeltaAzimuth is set to Absolute value of Azimuth−Desired Azimuth.

In step 1824, MaximumDelta is set equal to 90-ArcSine (MinimumLanding Distance/PadDistance). This computation is intended to create landing points that line up a straight line perpendicular to the desired Azimuth instead of in an arc around the pad.

In step 1826, the method 1800 determines if DeltaAzimuth is greater than MaximumDelta. If DeltaAzimuth is greater than MaximumDelta, then go to step 1812. If DeltaAzimuth is not greater than MaximumDelta, then go to step 1828.

In step 1828, the method 1800 determines if Segment from Pad to Point intersects any hazards. If Segment from Pad to Point intersects any hazards, then go to step 1812. If Segment from Pad to Point does not intersect any hazards, then go to step 1830.

In step 1830, the method 1800 returns CurrentPosition to step 1708 or step 1720 in FIG. 17. CurrentPosition is the current distance along the segment between Location1 and Location2. Since it is being returned, it is the distance at the first point checked that is the proper distance and at an acceptable angle from a pad. If unsuccessful, the total length of the segment (distance) is returned in step 1832.

In step 1832, the method 1800 returns Distance to step 1708 or step 1720 in FIG. 17.

Referring now to FIG. 19, one embodiment of the "CheckForOverlappingtoes (Vout,Heel)" algorithm for step 1738 in FIG. 17 is illustrated. The method 1900 generally addresses the special-case situation where a particular landing point for reverse-facing lateral well cannot be planned because the previously-planned forward-facing lateral well was planned to be a maximum lateral length from heel to toe and there is not enough distance between the two heels for a maximum lateral length lateral well, plus a minimum lateral length lateral well, plus the toe toe spacing distance, but there is enough room for two minimum lateral length (or greater) lateral wells plus the toe toe spacing. The method 1900 therefore, generally establishes that the second to last location in the set Vout is the heel of a heel toe pair that is both in the same line as the new reverse-facing heel, and is an appropriate distance for the toes to be adjusted. Once this is established, then it is a simple matter to remove the last two, subtract the toe toe spacing from the distance between the two heels and divide the difference by two to get the lengths for the two lateral wells and create new toe points at that distance from the two heels. Both new toes and the new heel can then be added to the set Vout.

In step 1902, the method 1900 determines if the Size of Vout is less than 2. If the Size of Vout is less than 2, then go to step 1903. If the Size of Vout is not less than 2, then go to step 1904.

In step 1903, the method 1900 returns to step 1738.

In step 1904, LocationH is set equal to the second to last element of Vout and LocationT is set equal to the last element of Vout.

In step 1906, the method 1900 determines if Azimuth from LocationH to Heel is not equal to Azimuth from LocationT to Heel. If Azimuth from LocationH to Heel is not equal to Azimuth from LocationT to Heel, then go to step 1907. If Azimuth from LocationH to Heel is equal to Azimuth from LocationT to Heel, then go to step 1908.

In step 1907, the method 1900 returns to step 1738.

In step 1908, the method 1900 determines if Distance from LocationT to Heel is greater than MinimumLateralLength+ToeToeSpacing. If Distance from LocationT to Heel is greater than MinimumLateralLength+ToeToeSpacing, then go to step 1909. If Distance from LocationT to Heel is not greater than MinimumLateralLength+ToeToe Spacing, then go to step 1910.

In step 1909, the method 1900 returns to step 1738.

In step 1910, Distance is set equal to Distance from LocationH to Heel.

In step 1912, the method 1900 determines if Distance is less than (2*Minimum LateralLength)+ToeToeSpacing. If Distance is less than (2*MinimumLateralLength)+ToeToeSpacing, then go to step 1913. If Distance is not less than (2*MinimumLateral Length)+ToeToeSpacing, then go to step 1914.

In step 1913, the method 1900 returns to step 1738.

In step 1914, Length is set equal to (Distance−ToeToeSpacing)/2.

In step 1916, LocationT is removed from Vout.

In step 1918, LocationT is created as a point Length along segment from LocationH to Heel.

In step 1920, Heel is added to Vout.

In step 1922, Toe is added to Vout.

In step 1923, the method 1900 returns to step 1738.

The present invention therefore, enables boundary areas to be filled with either single or stacked horizontal laterals. Initially, concentric and radial horizontal laterals can also be generated using the present invention. Pre-defined parameters dictate the geometry and orientation that will be used to position and fill in the boundary area. Internal boundary areas can be defined such that horizontal laterals could be truncated, if necessary. Additionally, if there is faulting in the boundary area, faults could be used to terminate horizontal laterals and start new horizontal laterals a certain distance from the fault. The present invention also permits horizontal laterals to be placed on a specific subsurface grid for proper depth placement and can be offset from same if necessary to maintain a specific distance from an oil/water contact, for example. Unilateral and bilateral direction can be specified and in the latter case, recommended heel/heel separation can be computed to insure optimal position for pads.

System Description

The present invention may be implemented through a computer-executable program of instructions, such as program modules, generally referred to as software applications or application programs executed by a computer. The software may include, for example, routines, programs, objects, components, and data structures that perform particular tasks or implement particular abstract data types. The software forms an interface to allow a computer to react according to a source of input. AssetPlanner™, which is a commercial software application marketed by Landmark Graphics Corporation, may be used as an interface application to implement the present invention. The software may also cooperate with other code segments to initiate a variety of tasks in response to data received in conjunction with the source of the received data. The software may be stored and/or carried on any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire and/or through any of a variety of networks such as the Internet.

Moreover, those skilled in the art will appreciate that the invention may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Figure 21:
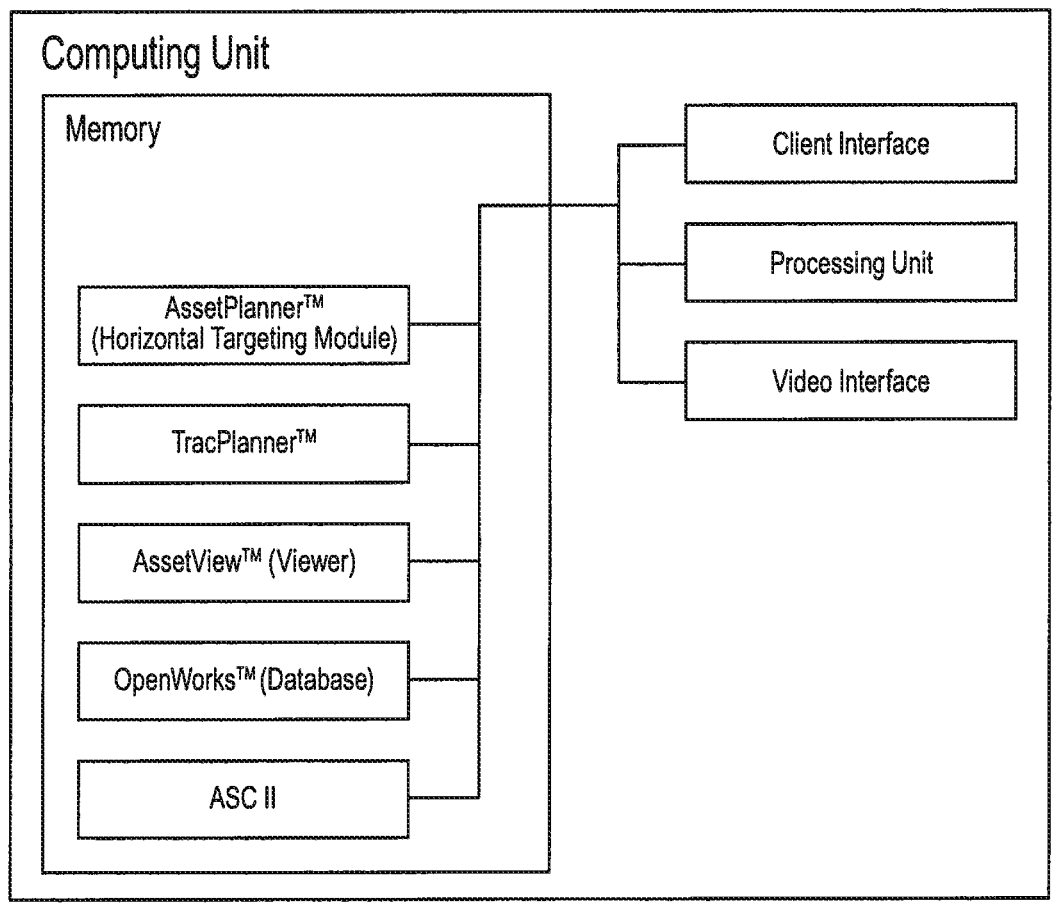
FIG. 21 is a block diagram illustrating one embodiment of a computer system for implementing the present invention.

Referring now to FIG. 21, a block diagram of a system for implementing the present invention on a computer is illustrated. The system includes a computing unit, sometimes referred to as a computing system, which contains memory, application programs, a database, a viewer, ASCII files, a client interface, a video interface and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the present invention described herein and illustrated in FIGS. 1-20. The memory therefore, includes OpenWorks™, which may be used as a database to supply data and/or store data results such as, for example, subsurface grids and surface elevations. ASCII files may also be used to supply data and/or store the data results. The memory also includes AssetView™, which may be used as a viewer to display the data and data results such as, for example, map images, surface and subsurface grids loaded from Open Works™ into AssetView™ that are used to define the lease or acreage boundaries. The horizontal targeting module in AssetPlanner™ uses pre-defined lease, acreage or grid boundaries to determine the spacing and positioning requirements for the horizontal laterals—also referred to as targets or target pairs. Subsurface 3D grids loaded into AssetView™ may also be used as boundaries. In one application, for example, polygonal areas may be drawn directly in AssetView™ and defined as boundaries using the client interface and TracPlanner™. In another application, for example, a polygonal area could also be defined directly in TracPlanner™ using the client interface or by importing from the ASCII file as specified by the client interface. Once the boundaries are defined, the client interface may be used to enter horizontal targeting parameters. These parameters dictate the desired horizontal pattern type, lengths, spacing and azimuth, which are processed by the horizontal targeting module in AssetPlanner™ to generate the desired horizontal targeting pattern. The desired horizontal targeting pattern therefore, is used to position horizontal laterals (or target pairs) within the boundaries. The horizontal targeting module processes the foregoing data using the methods described herein and illustrated in FIGS. 1-20 to generate the desired horizontal targeting pattern(s). TracPlanner™, AssetView™ and OpenWorks™ are commercial software application marketed by Landmark Graphics Corporation.

Although the computing unit is shown as having a generalized memory, the computing unit typically includes a variety of computer readable media. By way of example, and not limitation, computer readable media may comprise computer storage media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through application program interface ("API"), which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/non-removable, volatile/non-volatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

While the present invention has been described in connection with presently preferred embodiments, it will be understood by those skilled in the art that it is not intended to limit the invention of those embodiments. Although the illustrated embodiments of the present invention relate to the creation and positioning of horizontal oil and gas wells, the present invention may be applied to any other type of well in other fields and disciplines. It is therefore, contemplated that various alternative embodiments and modifications may be made to the enclosed embodiments without departing from the spirit and scope of the invention defined by the appended claims and the equivalents thereof.

The invention claimed is:
1. A computer-implemented method, comprising:
   computing, by a computing device, a center location of a predetermined boundary;
   defining, by the computing device, a circle around the center location, a radius of the circle being within the predetermined boundary;
   defining, by the computing device, a pair of points along the circle by defining each of a first point and a second point on the circle, the second point being defined at a predetermined angular distance away from the first point;
   iteratively, by the computing device, defining one or more additional circles around the center location, each additional circle of the one or more additional circles being smaller than the last-defined circle, a pair of new points being defined on each additional circle, the pair of new points including a first new point and a second new point, and the second new point being the predetermined angular distance away from the first new point;

forming, by the computing device, a horizontal lateral section of a horizontal well using the pair of points and each pair of new points; and displaying, by the computing device, the horizontal lateral section of the horizontal well in a plan view.

2. The computer-implemented method of claim 1, the one or more additional circles includes a first additional circle with a first radius and a second additional circle with a second radius, wherein the second radius is smaller than the first radius.

3. The computer-implemented method of claim 2, wherein the first point is defined at a position north of the center location and the second point is defined at another position that is the predetermined angular distance away from the first point in the clockwise direction.

4. The computer-implemented method of claim 2, wherein the first radius corresponds to a distance between the center location and a midpoint between the first point and the second point.

5. The computer-implemented method of claim 4, wherein the first new point is located at the midpoint between the first point and the second point, and wherein the second new point is located the predetermined angular distance away from the first new point in the clockwise direction.

6. The computer-implemented method of claim 4, wherein the first radius corresponds to a distance between the center location and a midpoint between the first point and the second point minus a predetermined well spacing.

7. The computer-implemented method of claim 1, wherein additional circles are iteratively defined until a radius of an additional circle is zero.

8. A system, comprising:
one or more data processors; and
a non-transitory computer-readable storage medium containing instructions which, when executed on the one or more data processors, cause the one or more data processors to perform operations including:
computing a center location of a predetermined boundary;
defining a circle around the center location, wherein a radius of the circle is within the predetermined boundary;
defining a pair of points along the circle by defining each of a first point and a second point on the circle, the second point being defined at a predetermined angular distance away from the first point;
iteratively defining one or more additional circles around the center location, each additional circle of the one or more additional circles being smaller than the last-defined circle, a pair of new points being defined on each additional circle, the pair of new points including a first new point and a second new point, and the second new point being the predetermined angular distance away from the first new point;
forming a horizontal lateral section of a horizontal well using the pair of points and each pair of new points; and
displaying, by a computing device, the horizontal lateral section of the horizontal well in a plan view.

9. The system of claim 8, the one or more additional circles includes a first additional circle with a first radius and a second additional circle with a second radius, wherein the second radius is smaller than the first radius.

10. The system of claim 9, wherein the first point is defined at a position north of the center location and the second point is defined at another position that is the predetermined angular distance away.

11. The system of claim 9, wherein the first radius corresponds to a distance between the center location and a midpoint between the first point and the second point.

12. The system of claim 11, wherein the first new point is located at the midpoint between the first point and the second point, and wherein the second new point is located the predetermined angular distance away from the first new point in the clockwise direction.

13. The system of claim 11, wherein the first radius corresponds to a distance between the center location and a midpoint between the first point and the second point minus a predetermined well spacing.

14. The system of claim 8, wherein additional circles are iteratively defined until a radius of an additional circle is zero.

15. A computer-program product tangibly embodied in a non-transitory machine-readable storage medium, including instructions configured to cause a data processing apparatus to perform operations including:
computing a center location of a predetermined boundary;
defining a circle around the center location, wherein a radius of the circle is within the predetermined boundary;
defining a pair of points along the circle by defining each of a first point and a second point on the circle, the second point being defined at a predetermined angular distance away from the first point;
iteratively defining one or more additional circles around the center location, each additional circle of the one or more additional circles being smaller than the last-defined circle, a pair of new points being defined on each additional circle, the pair of new points including a first new point and a second new point, and the second new point being the predetermined angular distance away from the first new point;
forming a horizontal lateral section of a horizontal well using the pair of points and each pair of new points; and
displaying the horizontal lateral section of the horizontal well in a plan view.

16. The computer-program product of claim 15, the one or more additional circles includes a first additional circle with a first radius and a second additional circle with a second radius, wherein the second radius is smaller than the first radius.

17. The computer-program product of claim 16, wherein the first point is defined at a position north of the center location and the second point is defined at another position that is the predetermined angular distance away from the first point in the clockwise direction.

18. The computer-program product of claim 16, wherein the first radius corresponds to a distance between the center location and a midpoint between the first point and the second point.

19. The computer-program product of claim 18, wherein the first new point is located at the midpoint between the first point and the second point, and wherein the second new point is located the predetermined angular distance away from the first new point in the clockwise direction.

20. The computer-program product of claim 18, wherein the first radius corresponds to a distance between the center location and a midpoint between the first point and the second point minus a predetermined well spacing.

* * * * *